United States Patent [19]

McClean

[11] 4,062,717
[45] Dec. 13, 1977

[54] METHOD AND APPARATUS FOR WINDING A FIBER REINFORCED BELL ON THE END OF A PIPE

[75] Inventor: William George McClean, Milwaukee, Wis.

[73] Assignee: McClean Anderson, Inc., Milwaukee, Wis.

[21] Appl. No.: 618,968

[22] Filed: Oct. 2, 1975

[51] Int. Cl.$^2$ ............................................ B65H 81/00
[52] U.S. Cl. .................................... 156/425; 156/172; 156/433; 156/446; 156/458; 242/7.22
[58] Field of Search ............... 156/172, 173, 175, 187, 156/195, 425, 429, 433, 446, 448, 458, 566, 428; 242/7.22

[56] References Cited

U.S. PATENT DOCUMENTS

| | | | |
|---|---|---|---|
| 2,383,582 | 8/1945 | Barbehenn | 156/190 |
| 3,414,956 | 12/1968 | Genson | 156/175 |
| 3,519,520 | 7/1970 | Newman, Jr. | 156/173 |
| 3,697,346 | 10/1972 | Van Dorn et al. | 156/172 |
| 3,804,687 | 4/1974 | Peterson | 156/172 |
| 3,901,757 | 8/1975 | Eglinton | 156/446 |
| 3,925,132 | 12/1975 | Bartlow et al. | 156/172 |

Primary Examiner—Charles E. Van Horn
Assistant Examiner—Michael W. Ball

Attorney, Agent, or Firm—Andrus, Sceales, Starke & Sawall

[57] ABSTRACT

A method and apparatus for winding a fiber reinforced resin bell on the end of a pipe. The apparatus includes a pair of parallel conveyor lines with each line having a series of corresponding stations and the pipes on each line are moved or indexed progressively through the stations. Corresponding stations in each conveyor line are winding stations, and as each pipe is indexed to the winding station, it is moved axially toward the opposite conveyor line. The pipe is rotated about its axis and a resin impregnated fibrous band is wound around an insert projecting from the end of the pipe to form the bell. As the band is being wound, a second pipe from the winding station of the other conveyor is moved axially to position the end of the second pipe in proximate abutting relation to the end of the first pipe being wound. After the winding operation has been completed on the first pipe, the band is transferred to the adjacent end of the second pipe and the band is severed. As the band is wound on the second pipe to form the bell, the first pipe is moved back to the conveyor line and another pipe is indexed to the winding station and moved axially inward to position the pipe end adjacent the end of the pipe being wound.

15 Claims, 33 Drawing Figures

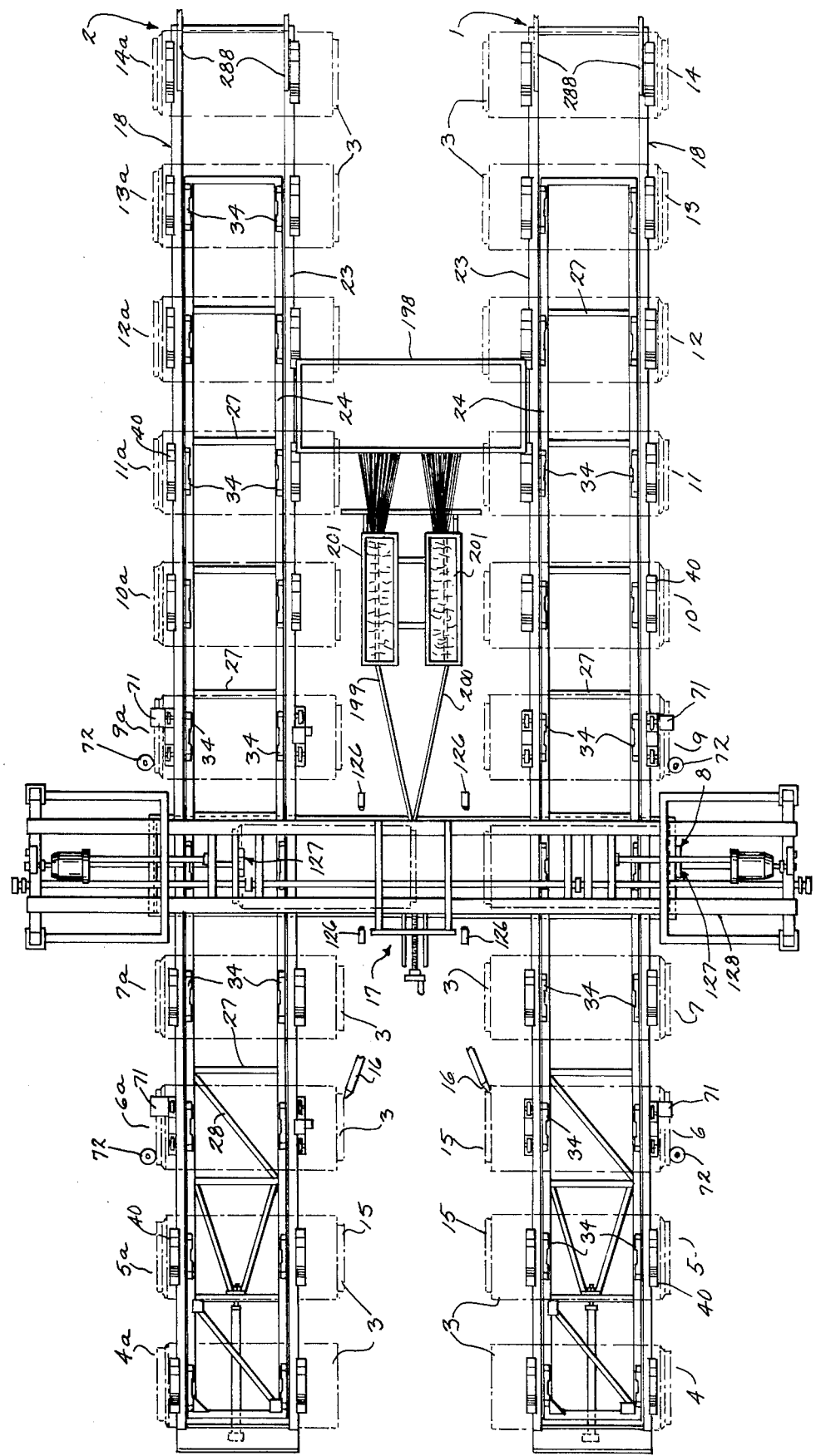

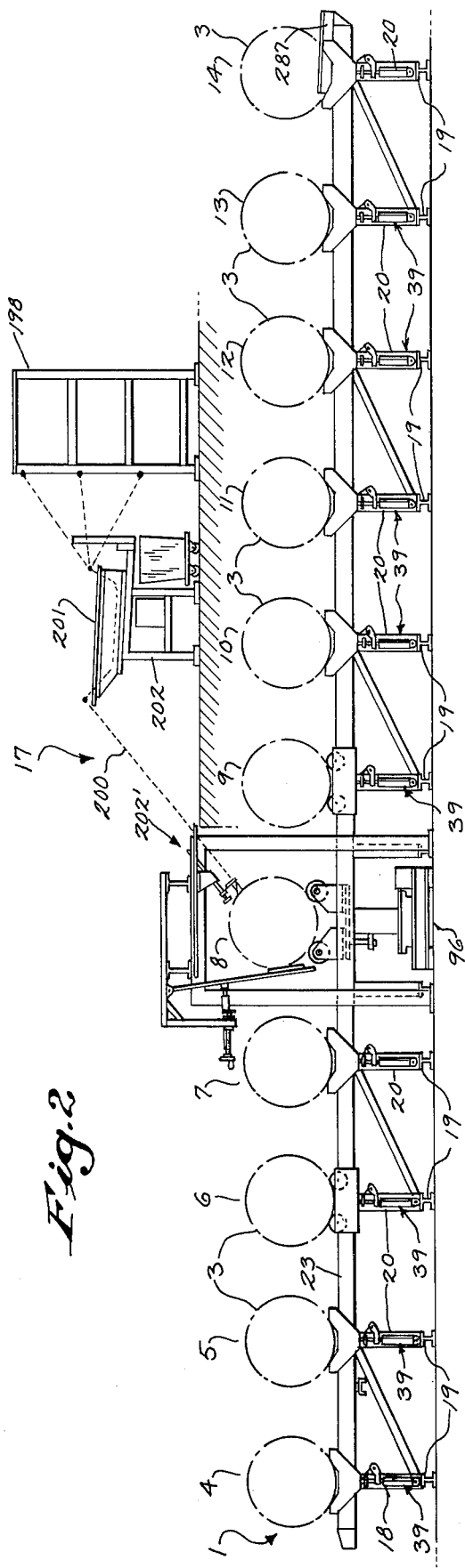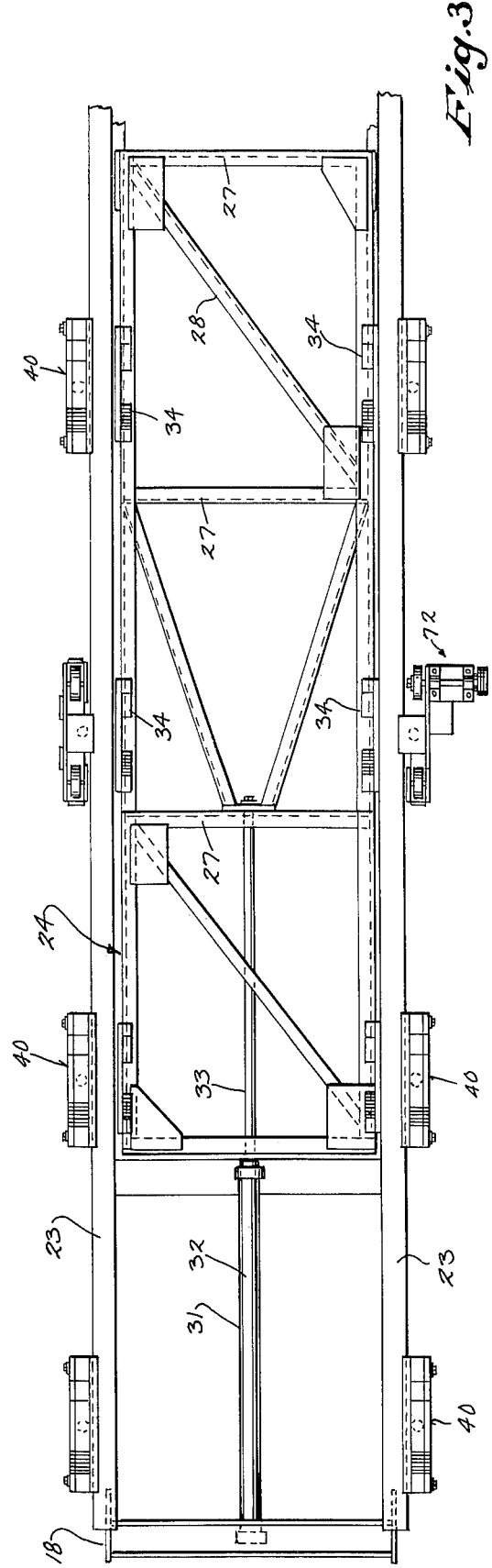

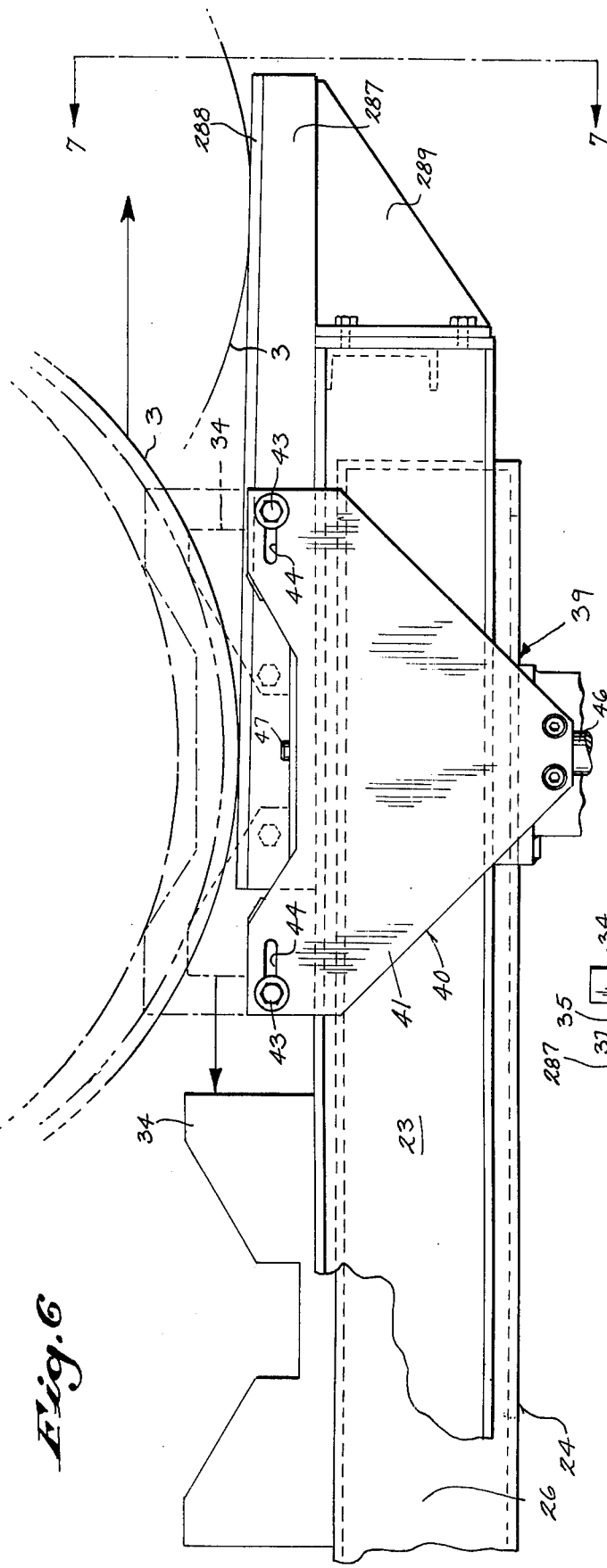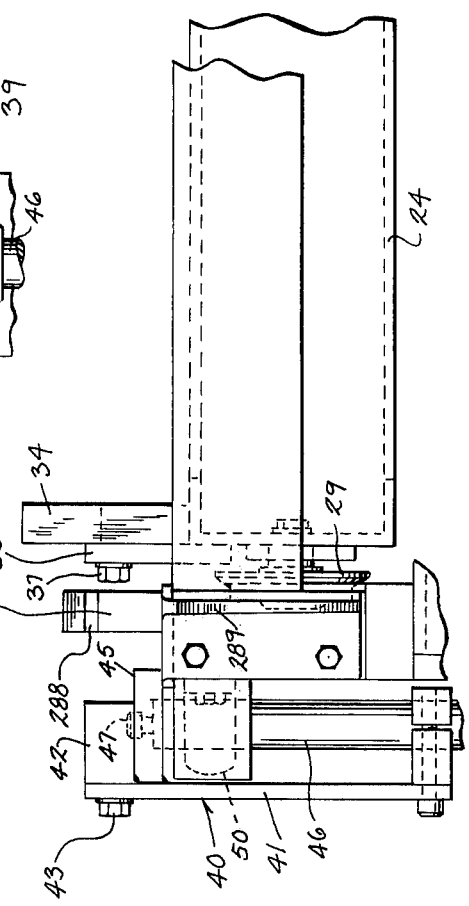

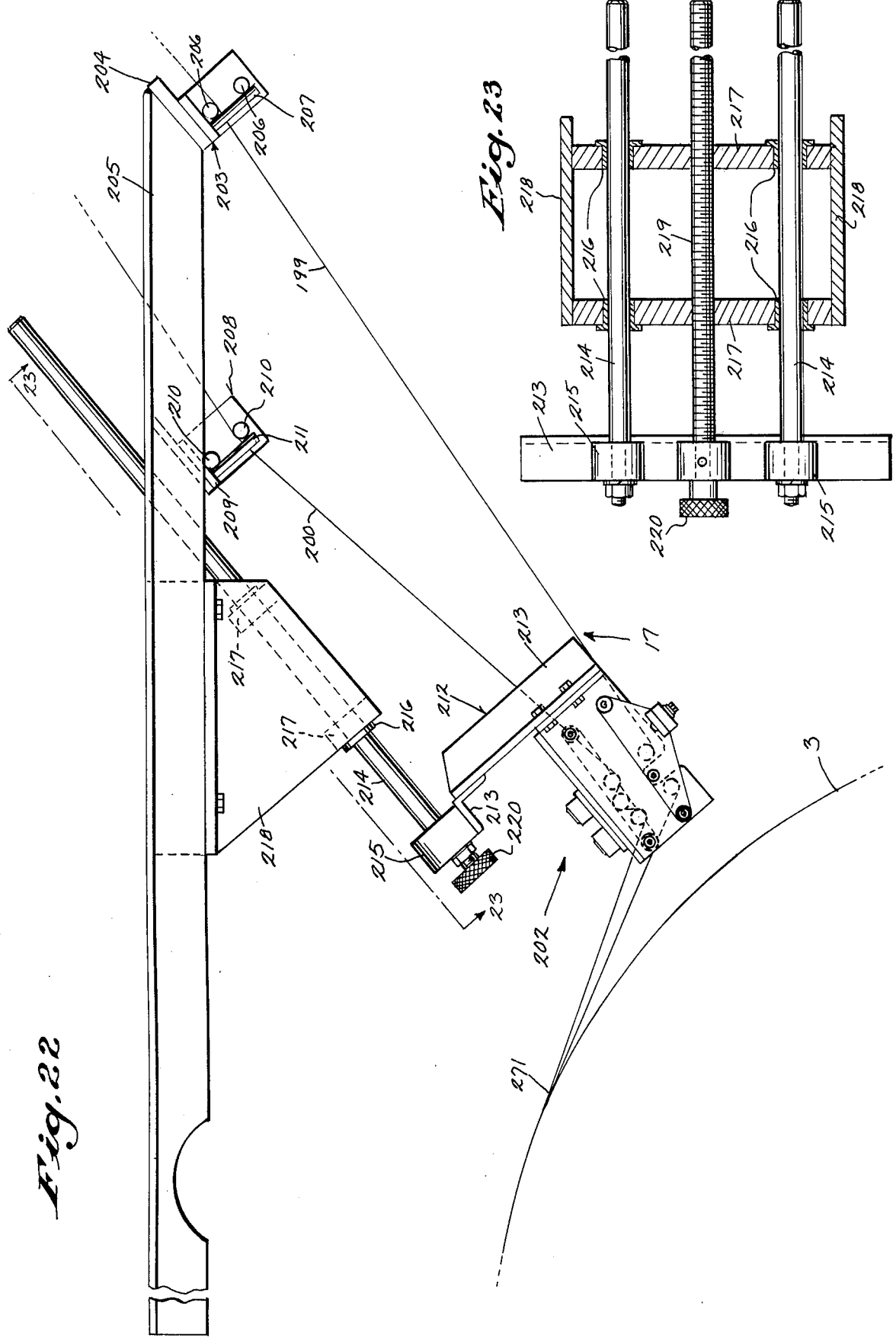

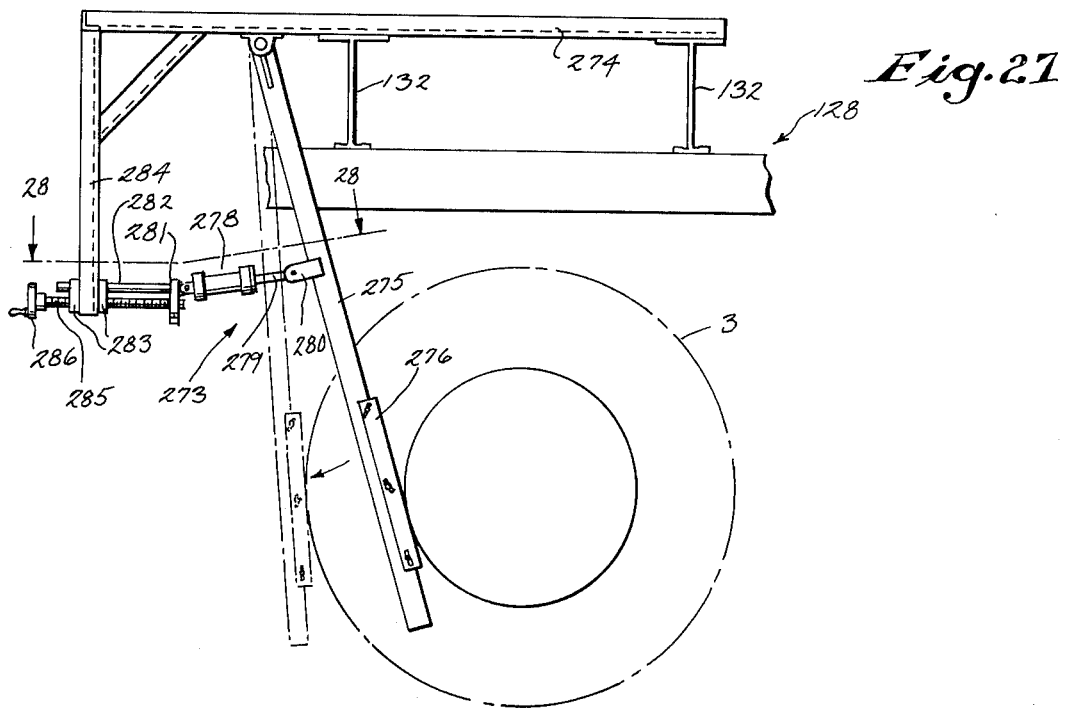
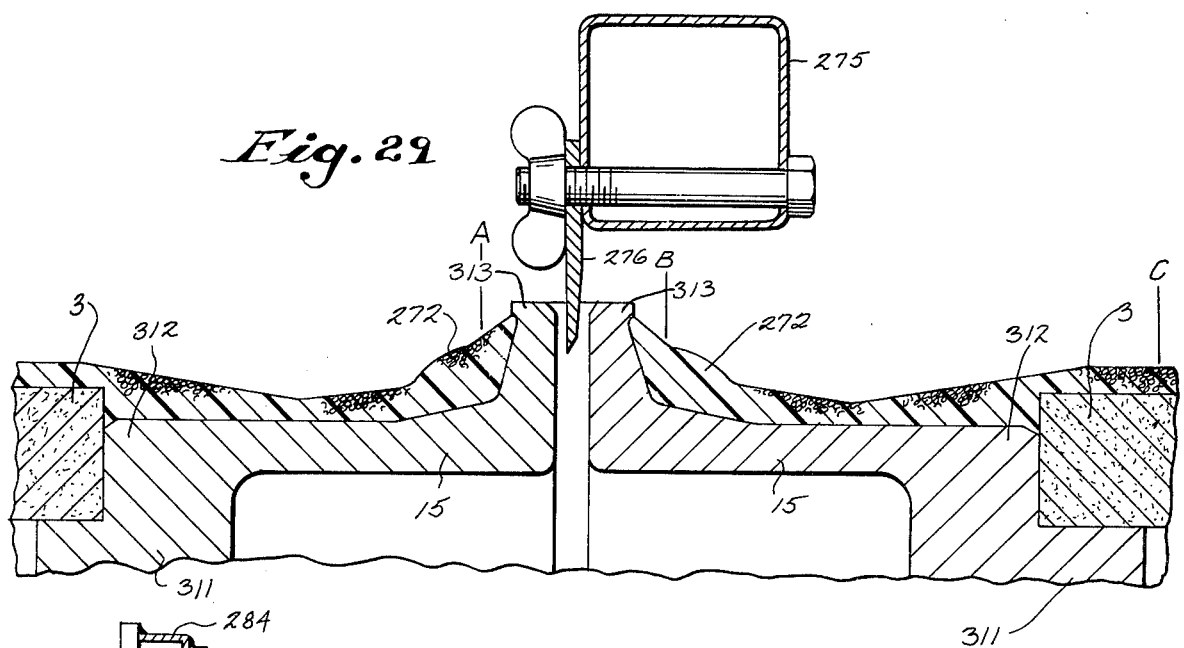
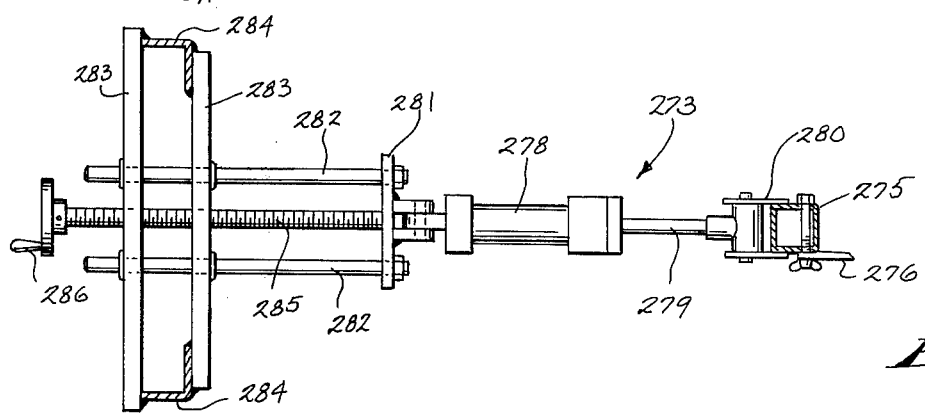

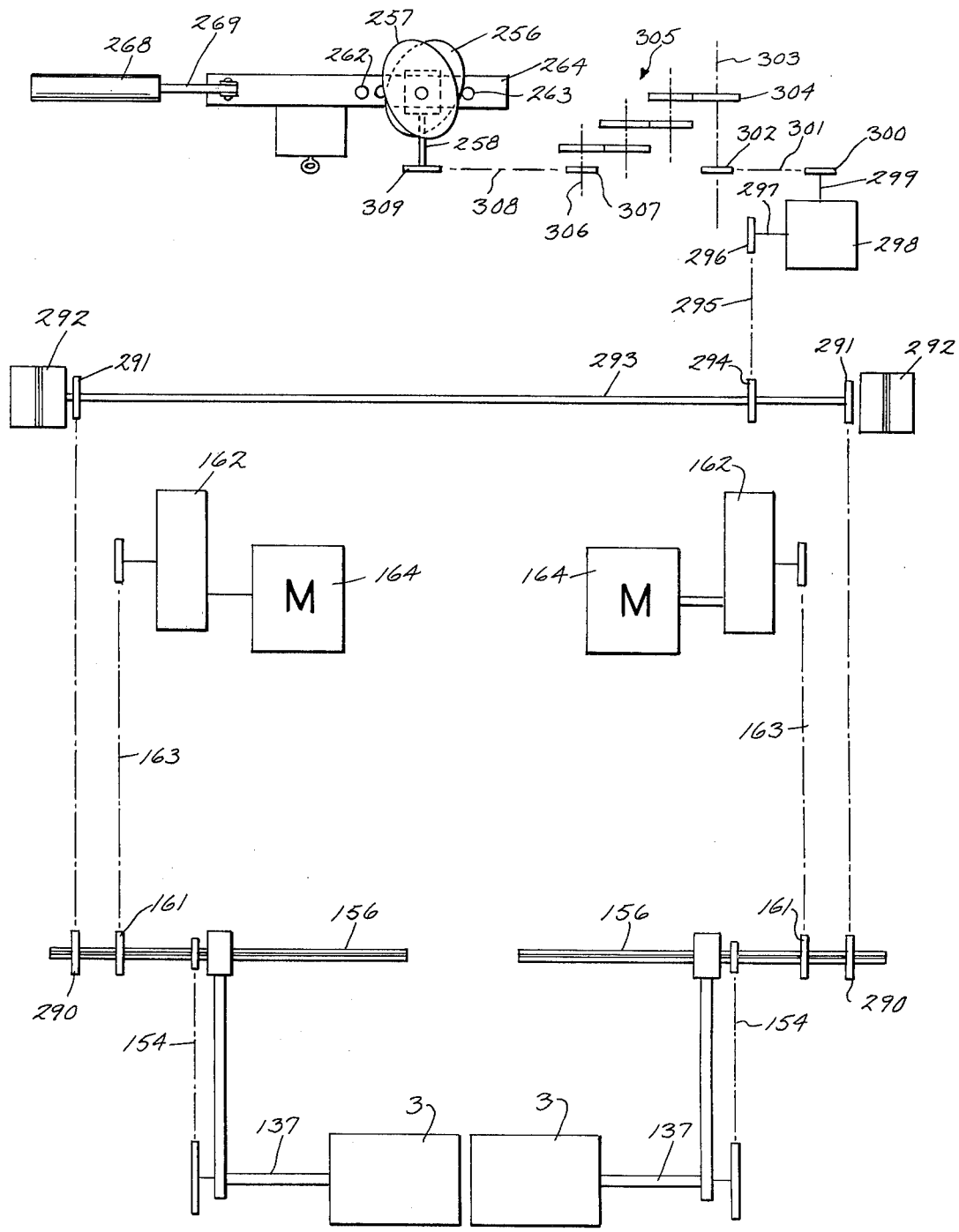

METHOD AND APPARATUS FOR WINDING A FIBER REINFORCED BELL ON THE END OF A PIPE

BACKGROUND OF THE INVENTION

Large diameter clay pipes are used for drainage systems and are generally molded with an enlarged bell end while the opposite or spigot end of the pipe is machined to form a groove. On installation, the spigot end is inserted within the bell end of a second pipe and the joint between the pipes is sealed.

Because of the enlarged bell at the end of the pipe, clay pipes in the past have been molded rather than being extruded. In the molding operation, the pipe is formed vertically and the length of the pipe is limited to about eight feet due to the slump characteristics of the clay when it is removed from the mold.

As the bell end projects laterally from the pipe, it is fragile and is subject to breakage during handling and transporting. Furthermore, during laying of the pipe it is customary to shift the pipes by prying with a crowbar and this occasionally will cause breakage of the bell end. Moreover, it is frequently necessary to dig a trench in the ground to accommodate the enlarged diameter bell when laying the pipes for drainage purposes.

As a further disadvantage, the enlared diameter bell end reduces the number of pipes that can be stacked in the furnace during firing of the clay.

To eliminate the problems associated with the bell on large diameter clay pipe, it has been proposed to apply a fiber reinforced resin bell to a cylindrical clay pipe. The fiber reinforced resin bell has the advantage of being substantially stronger than the clay bell, thereby reducing the likelihood of breakage during storage, handling or installation. The fiber reinforced resin bell can be applied to an extruded cylindrical pipe rather than a molded pipe and this enables substantially longer lengths of the large diameter pipe to be utilized.

SUMMARY OF THE INVENTION

The invention relates to a method and apparatus for forming a fiber reinforced resin bell on the end of a cylindrical pipe, and in particularly, large diameter pipe.

The apparatus of the invention comprises two generally parallel conveying lines, with each conveying line having a series of corresponding working stations and pipes on each line are progressively moves or indexed through the stations. Each conveyor line includes a winding station where resin impregnated fibrous material is wound on an insert or mold projecting from the end of the pipe to form the bell.

After a pipe is indexed to the winding station of the conveyor line, it is then moved axially toward the other conveyor line and rotated about its axis by means of an internal chuck mechanism. The resin impregnated fibrous material is then wound about the projecting insert to form the bell.

When the winding is completed, the fibrous material is transferred to the end of a second pipe which is located in proximate end-to-end relation with the first pipe, and is wound about the insert projecting from the end of that pipe. While the second pipe is being wound, the fibrous material is severed and the rotation of the first pipe is stopped. The first pipe is then withdrawn axially to the conveyor line, and the conveyor line is indexed to position a third pipe at the winding station.

The third pipe is then moved laterally inward to position the end of the third pipe in proximate abutting relation with the second pipe being wound and rotated about its axis so that when the winding of the second pipe is completed the fibrous material can be again transferred to the adjacent end of the third pipe. This process is repeated with the winding being alternately transferred between pipes of both conveyor lines.

The invention provides an automated system for winding the fiber reinforced bell on the end of the pipe. As the bell on each pipe is being wound, the previously wound pipe is withdrawn and a subsequent pipe is positioned so that the winding operation is alternately transferred between pipes of both conveyor lines.

The chuck mechanism which rotates the pipe about its axis includes an automatic adjusting feature that allows out-of-round pipes, or pipes of carying circumference, to be rotated on supporting rollers and at the same time maintains constant rotational indexing between the chuck spindle and the pipe.

As a feature of the invention, the fibrous winding material is preferably in the form of two separate bands, each composed of parallel strands or rovings and each impregnated with a separate resin system. The strands of each band are intermingled in alternating sequence with the strands of the second band and the composite band is then wound on the pipe. The resin systems are designed so that each system alone has a relatively long pot life or curing time while the composite resin system has a fast curing time. Thus, intermingling the strands of the two bands will act to combine the two resin systems to accelerate the curing time without the addition of heat.

Other objects and advantages will appear in the course of the following description.

DESCRIPTION OF THE DRAWINGS

The drawings illustrate the best mode presently contemplated of carrying out the invention.

In the drawings:

FIG. 1 is a top elevation of the apparatus of the invention;

FIG. 2 is a side elevation of the apparatus shown in FIG. 1;

FIG. 3 is an enlarged fragmentary plan view showing a portion of one of the conveyors;

FIG. 6 is an enlarged fragmentary side elevation of a lifting unit with the lifting unit in the lowered position and the reciprocating frame being retracted;

FIG. 7 is a section taken along line 7—7 of FIG. 6;

FIG. 17 is a top view of the structure shown in FIG. 15 with parts broken away;

FIG. 22 is a side elevation of the delivery unit for winding the resin impregnated strand on the pipe end;

FIG. 23 is a view taken along line 23—23 of FIG. 22;

FIG. 27 is a side elevational view showing the strand cutting mechanism;

FIG. 28 is an enlarged view taken along line 28—28 of FIG. 27;

FIG. 29 is an enlarged sectional view and showing the blade severing the strand at the joint between the two pipes;

FIG. 33 is a schematic representation of the drive mechanism of the apparatus.

DESCRIPTION OF THE ILLUSTRATED EMBODIMENT

Figure 4:
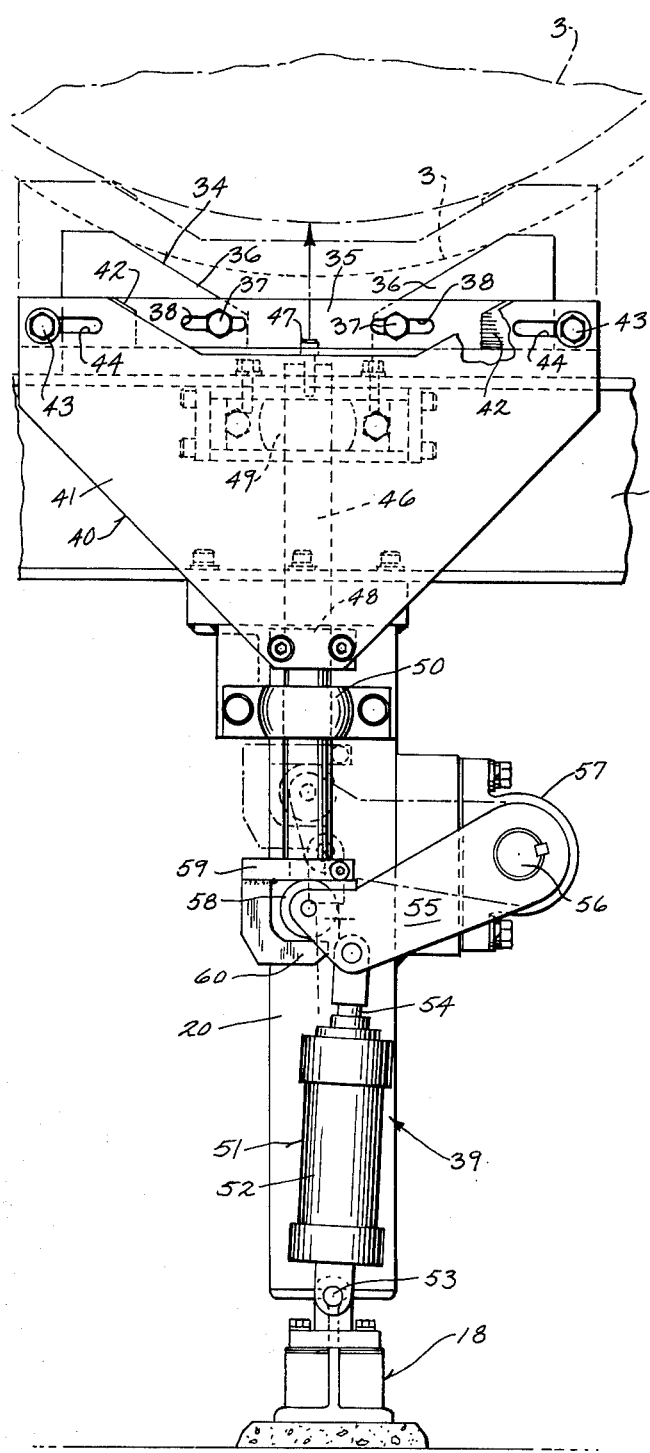
FIG. 4 is a side elevation of one of the pipe lifting units.

As illustrated in FIGS. 1 and 2, the apparatus of the invention includes a pair of parallel conveyors 1 and 2, each of which is adapted to progressively more or index large diameter pipes 3 through a series of working stations. The pipes 3 are formed of fired clay and generally have a diameter of about two to four feet, being used principally for drainage systems.

Each pipe 3 is adapted to be moved progressively through stations 4-14 on conveyor 1 and similarly each pipe on the conveyor 2 is adapted to be indexed between a series of corresponding stations 4a-14a. As stations 4a-14a are identical to stations 4-14, the description will be directed primarily to the stations 4-14.

Station 4 is a entry station and the pipe 3 is introduced on to the conveyor at the station 4 by crane or hoist mechanism.

A cylindrical metal insert 15 is positioned within the end of each pipe at station 5, and the insert 15 serves as a mold on which the resin impregnated fibrous material is subsequently wound to form the bell.

A gel coat of resin is applied to the outer surface to the projecting end of the insert 15 and to the adjacent end of the pipe 3 at station 6. The pipe is rotated about its axis at station 6 and the gel coat can be applied through use of the nozzle 16, as illustrated, or by brushing or other types of applicators.

Station 7 is a dwell station with no working operation being performed on the pipe, while station 8 is the winding station, and will be described in detail hereinafter. In general, the pipe at the winding station 8 is moved laterally inward toward the center line of the apparatus and a resin impregnated fibrous band is wound on the projecting end of the insert 15 as well as on the adjacent end of the pipe 3 by a filament winding unit, indicated generally by 17. After the winding is completed, the pipe is returned laterally outward to the conveyor line.

Station 9 is a curing station and while the pipe is at this station the thermosetting resin begins to cure. The pipe 3 at station 9 is rotated about its axis to prevent the liquid resin from dripping from the pipe.

Stations 10-13 are dwell stations with no working operation being performed on the pipe. During the period when the pipe is passing between the stations 10-13 the resin will be fully cured.

Station 14 is a discharge station and the pipe is discharged from the conveyor line at this station.

Each conveyor 1 and 2 comprises a supporting structure 18 that includes a series of base beams 19 that rest on the foundation or other supporting surface. A pair of vertical columns or beams 20 are supported from each beam 19, and the columns 20 are connected by diagonal braces as well as upper cross members 22. Longitudinal I-beams 23 are supported on the upper ends of the columns 20 and extend the length of the conveyor.

The pipes 3 are adapted to be moved or indexed along the conveyor by a reciprocating frame 24 which supports the pipes and is adapted to reciprocate relative to the supporting structure 18.

Frame 24 includes a pair side members 26 which are connected by cross members 27 and diagonal braces 28. Rollers 29 are journaled on the side members 26 of frame 24 and are adapted to ride on the lower flange 30 of the longitudnal I-beams 23 of support structure 18.

To move the frame 24 in a reciprocating path with respect to the supporting structure 18, a hydraulic cylinder unit 31 is employed.

The cylinder unit 31, as best shown in FIG. 2, includes a cylinder 32 having one end connected to the supporting structure 18, and the ram 33, which is slideable within the cylinder 32, is connected to one of the cross members 27 of the frame 24. As the ram 33 is extended and contracted with respect to the cylinder 32, the frame 24 will be moved relative to the supporting structure 18.

To support a series of pipes 3 on the frame 24, cradles 34 are mounted on the side members 26 of the frame. The cradles 34 are positioned in transversely aligned pairs, so that the ends of each pipe will be supported by the aligned cradles 34.

Each cradle 34 includes a vertical plate 35 that is secured to the side member 26, and a pair of blocks 36 are adjustably mounted on each plate 35 by means of bolts 37 which extend through slots 38 in the plate. The slotted connection enables the blocks 36 to be moved horizontally to the plate 35. As illustrated in FIG. 4, the pipe is adapted to rest on the upper inclined surfaces of the blocks 36, and by removing the blocks toward or away from each other through the slotted connection, the cradles 34 can accommodate pipes of different diameters.

Figure 5:
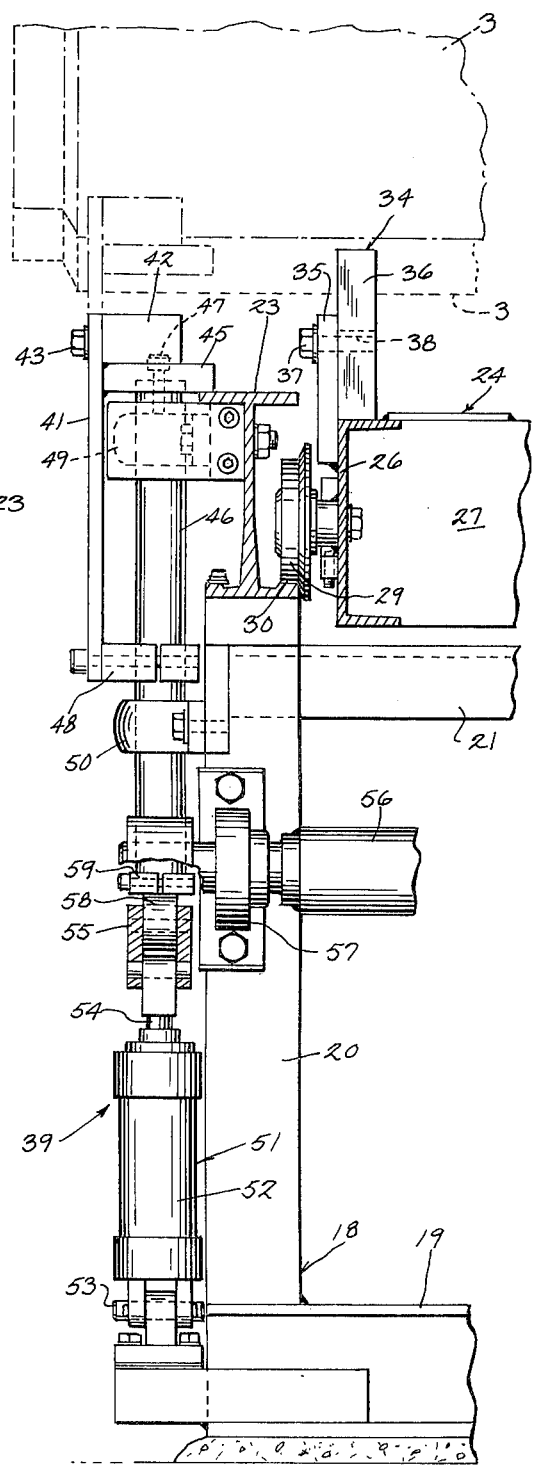
FIG. 5 is an end view of the lifting unit shown in FIG. 4; with parts broken away in section.

Each conveyor 1 and 2 includes a pair of lift units 39 located at each of the stations 4-7 and 9-13 which serve to lift the pipe at that station above the level of the reciprocating frame 24 to enable the frame to be returned to its original position without interference from the pipe. As best shown in FIGS. 4 and 5, each lift unit 39 includes a cradle 40 which is located laterally outwardly of the corresponding cradle 34. Each cradle 40 is composed of a general triangular plate 41, and a pair of blocks 42 are adjustably mounted to the upper corners of plate 41 through bolts 43 which extend through slots 44 in the plate. The slotted connection, as in the case of the slotted connection of cradle 34, enables the blocks 42 to be moved toward and away from each other to accommodate pipes of different diameter.

Each cradle 40 also includes an upper horizontal plate 45 which is secured to the upper end of a lift shaft 46 by stud 47. In addition, each cradle is provided with a lower bracket member 48 which is attached to the lower end of plate 41 and is secured to the shaft 46. The shaft 46 is mounted for vertical sliding movement with respect to the support structure 18 by bearing assemblies 49 and 50. Bearing assembly 49 is secured to the upper I-beam 23, while bearing assembly 50 is carried by the vertical column 20.

The shaft 46 and cradle 40 are moved vertically to lift the pipe from the cradles 34 on frame 24 by hydraulic cylinder unit 51. The cylinder unit 51 includes a cylinder 52 having its lower end pivotally connected by pin 53 to the supporting structure 18. A ram or piston rod 54 extendes from the upper end of the cylinder 52 and is pivotally connected to crank arm 55. One end of crank arm 55 is secured to end of a cross shaft 56 that extends transversely of the conveyor. Shaft 56 is journaled within bearing assemblies 57 carried by columns 20 at both sides of the conveyor and the cross shaft 56 acts to connect the crank arms 55 at opposite sides of the conveyor.

Journaled on the opposite end of the crank arm 55 is a roller 58 which bears against the lower surface of a plate 59 secured to lower end of shaft 46. As the ram 54 is extended, the roller 58 will push the shaft 46 upwardly to thereby lift the cradles 40 and elevate the pipe above the cradles 34 of the reciprocating frame 24. With the pipe elevated above the cradles 34, the frame 24 can be returned to its orignal position through operation of the cylinder unit 31. After the frame 24 has returned to its original position, the cylinder units 51 are operated to lower the cradles 40 and the pipe 3 to again position the pipe on the cradles 34 of the frame 24.

To aid in lowering the shaft 46 and cradle 40, a hook 60 is attached to plate 59. As the roller 58 is lowered, it will engage the hook 60 to lower the shaft 46 and cradle 40.

At stations 6 and 9, where the pipe 3 is adapted to rotate about its axis, the fixed cradles 40 are replaced by pipe rotating units 61. Each of the pipe rotating units 61 includes a vertical plane 62 which is secured to the shaft 46. A U-shaped roller support bracket 63 is adjustably connected to the plate 62, and bracket 63 carries idler roller 64. Each pipe rotating unit 61 also includes a second roller 65, and at each station 6 and 9, one of the rollers 65 is a live roller while the other roller is an idler roller. Thus, the pipe at stations 6 and 9 is supported on the three idler rollers and a drive roller.

The shaft 66 roller 65 is journaled in the bearing blocks 66a carried by horizontal plate 67 that extends outwardly from plate 62. Shaft 66 carries a sprocket 68 that is connected by chain 69 to a sprocket 70 on the drive shaft of hydraulic motor 71. Operation of the hydraulic motor 71 will act through the chain drive 69 to drive roller 65 to thereby rotate the pipe 3 about its axis.

Figure 8:
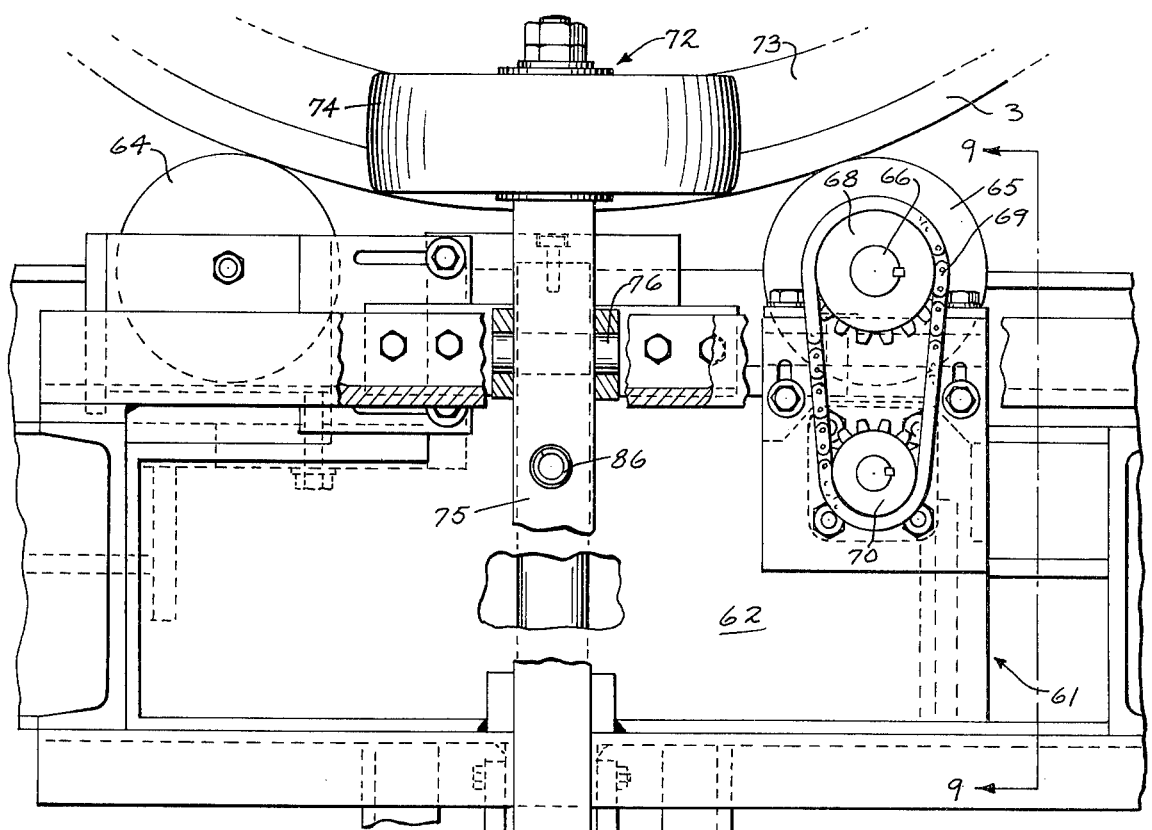
FIG. 8 is a fragmentary side elevation of a lifting unit incorporating a drive mechanism.
Figure 9:
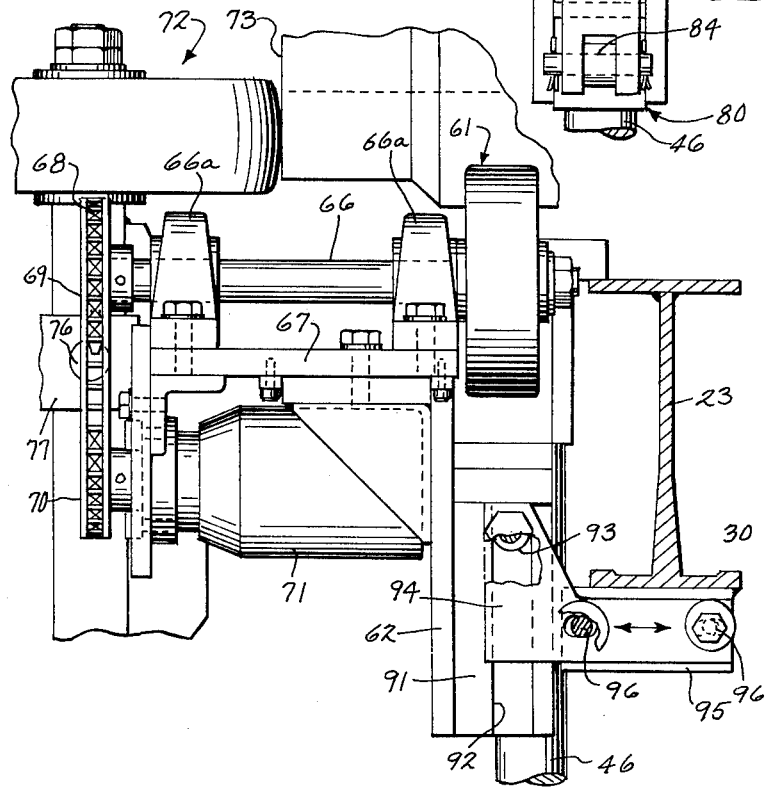
FIG. 9 is a section taken along line 9—9 of FIG. 8.
Figure 10:
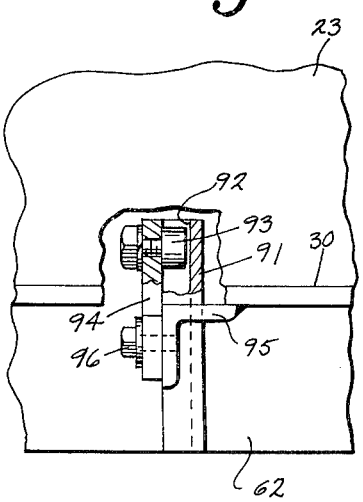
FIG. 10 is a partial end view of the structure of FIG. 9.
Figure 11:
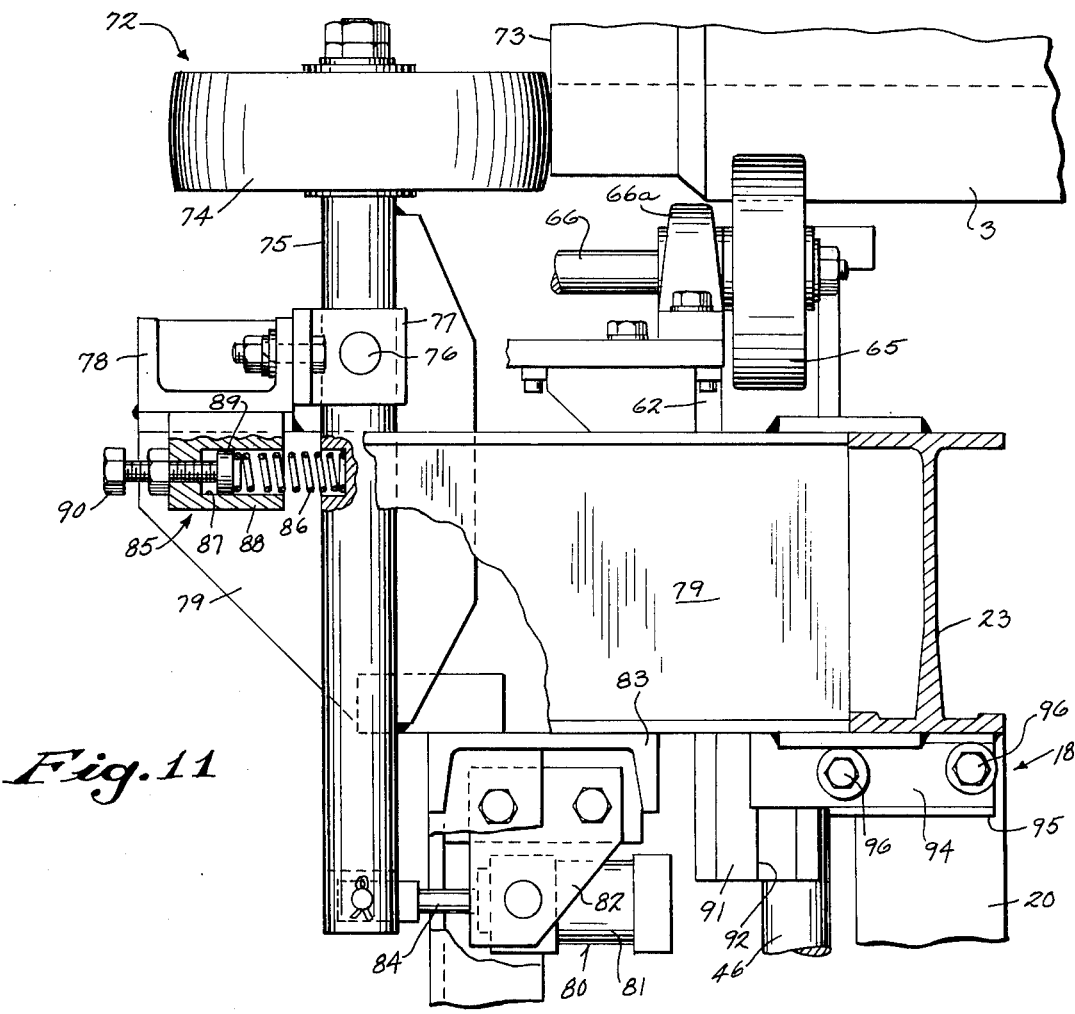
FIG. 11 is a section taken along line 11—11 of FIG. 8.

During rotation of the pipe at station 6 and 9 there is a tendency of the pipe to migrate longitudinally. To maintain alignment of the pipe and prevent axial migration, a positioner unit 72 is located at each station 6 and 9 and is adapted to be engaged by outer machined end 73 of pipe 3. Each positioner unit, as shown in FIG. 8 and 11, 72 includes a horizontal roller 74 which is mounted for rotation of the end of a vertical shaft 75. As shown in FIG. 11, the machined end 73 of the pipe is adapted to ride against the roller 74 as the pipe is rotated. As the position of the roller 74 is fixed during the rotation of the pipe, this engagement will prevent axial migration of the pipe.

The central portion of shaft 75 is pivoted with respect to the supporting structure 18 so that the shaft can tilt or pivot in a vertical plane. The pivotal connection is provided by pin 76 which extends through an opening in shaft 75 and aligned openings in angle brackets 77 which are attached to the channel 78. Channel 78 is mounted on a pair of beams 79 which extend outwardly from the supporting structure 18.

A cylinder unit 80 is used to position the roll 74. Cylinder unit 80 includes a cylinder 81 which is pivoted to brackets 82 carried by a cross channel 83 secured to the underside of beams 79. Cylinder unit 80 also includes a piston rod or ram 84 which is pivotly connected to lower end of shaft 75. Extending the piston rod 84, will pivot the shaft 75 to move the roller 74 inwardly to a given position, and as the pipe 3 carried by rollers 64 and 65 is rotated, the end of the pipe 73 will ride against the roller 74 to thereby position the pipe and prevent axial migration.

The roller 74 is adapted to be moved laterally outward in order that the pipe 3 can be transferred to the next station by the frame 24 without interference from the roller 74. A spring return unit 85 is employed to move the roller 74 laterally outward after the force of the cylinder unit 80 is released. The spring return unit 85 includes a coil spring 86 which is located within a bore 87 of block 88 attached to the lower surface of the channel 78. One end of the spring 86 is located within a recess in shaft 75, while the opposite end of the spring bears against a disc 89 in bore 87, and the disc is connected to an adjustable screw 90. By adjustment of screw 90, the force on spring 86 can be varied.

With this construction when the piston rod 84 is withdrawn, the spring return unit 85 will act to pivot the shaft 75 counterclockwise, as shown in FIG. 11, to thereby move the roller 74 laterally outward away from the pipe end 73 so that the pipe can be transferred to the next station without interference from the roller 74.

To guide the roller unit 61 in vertical movement with respect to supporting structure 18, a vertical 91 is secured to the inner surface of plate 62 and is formed with a vertical guide way 92. A roller 93 journaled on plate 94 rides in the guide way 92 as the roller unit 61 is raised and lowered by cylinder unit 51. Plate 94 is mounted to a fixed angle 95 secured to I-beam 23 by bolts 96 which pass through slotted holes in the plate 94. The slotted connection permits the plate 62 to be adjusted or pivoted laterally with respect to the axis of the left shaft 46 to thereby vary the relative position of rollers 64 and 65 carried by plate 62 with respect to support structure 18. By this adjustment, the direction of axial migration of the pipe 3 during rotation can be controlled so that the pipe will migrate toward the roller 74 of the positioner unit 72.

A lift unit 96 is located at the winding station 8 and serves not only to lift the pipe above the level of the frame cradle 34, but also acts to move the pipe laterally inward toward the center line of the apparatus in position for the insert 15 to be wound with the fibrous material. The lift unit 96 includes a base or supporting structure 97 which is mounted on the foundation and the base has a pair of side members 98. A track 99 is mounted on the base 97 adjacent of each side members 98 and a moveable carriage 100 is adapted to ride on the track 99. Brackets 101 are located at the four corners of the carriage 100, and rollers 102 are journaled in the brackets and ride on the track 99.

Figure 12:
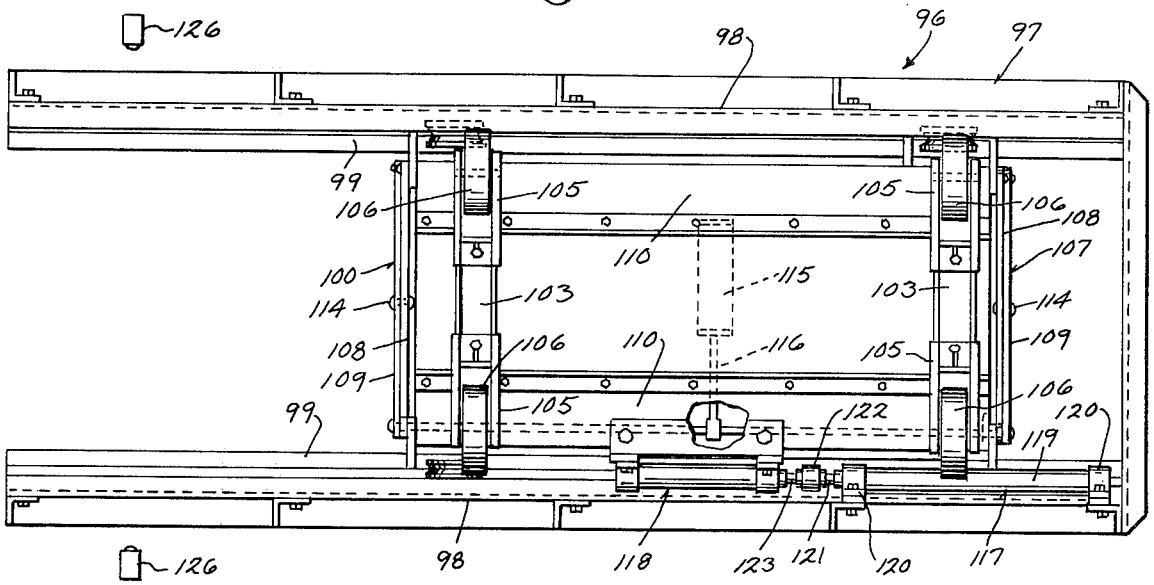
FIG. 12 is a top plan view with parts broken away showing the pipe supporting carriage at the winding station.
Figure 13:
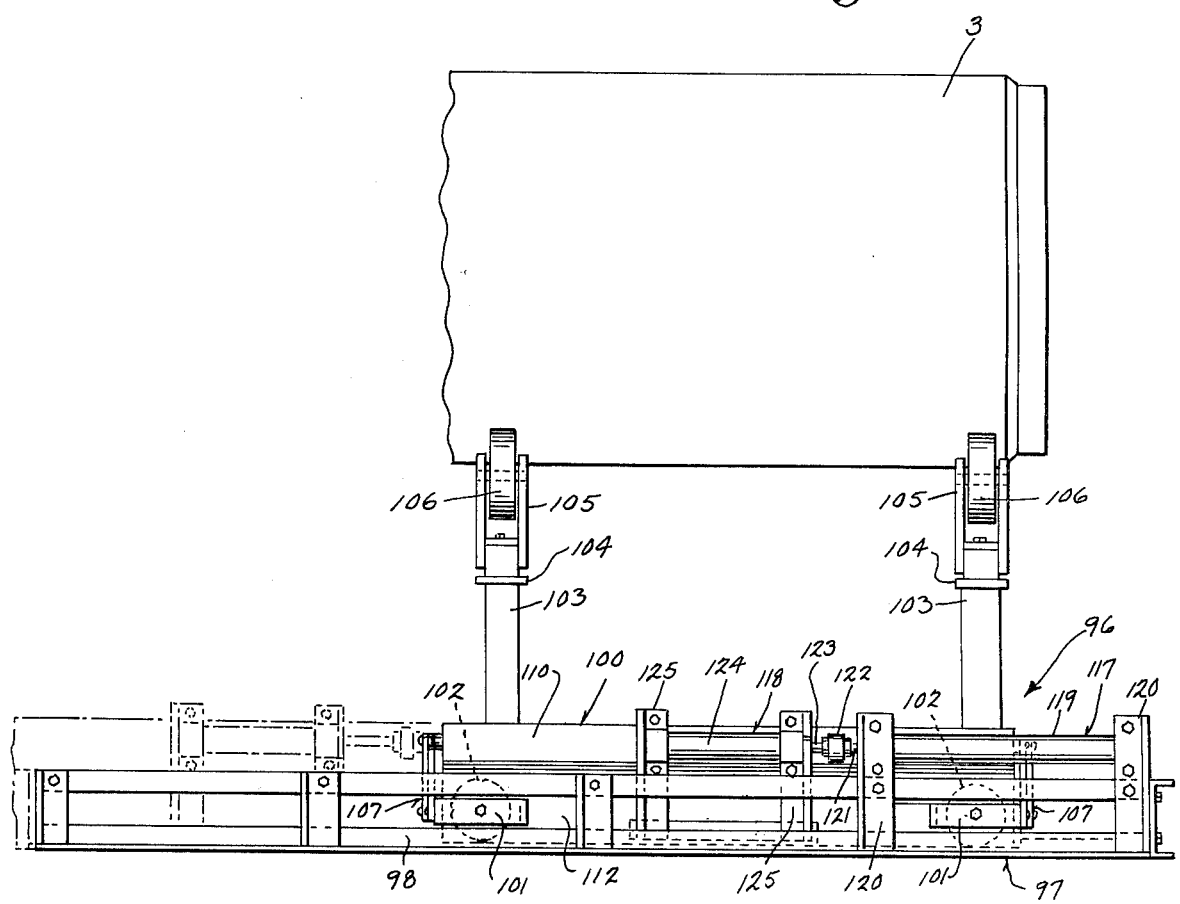
FIG. 13 is a side elevation of the structure shown in FIG. 11.

As best shown in FIGS. 12 and 13, a pair of vertical supports or columns 103 extend upwardly from the carriage 100 and columns 103 carry cross plates 104. A pair of roller brackets 105 are secured to each cross plate 104, and idler rollers 106 are journaled in the brackets 105. When the lift unit 96 is elevated, the rollers 106 will engage the pipe 23 and lift the pipe upwardly from the cradles 34 of the frame 24.

Figure 14:
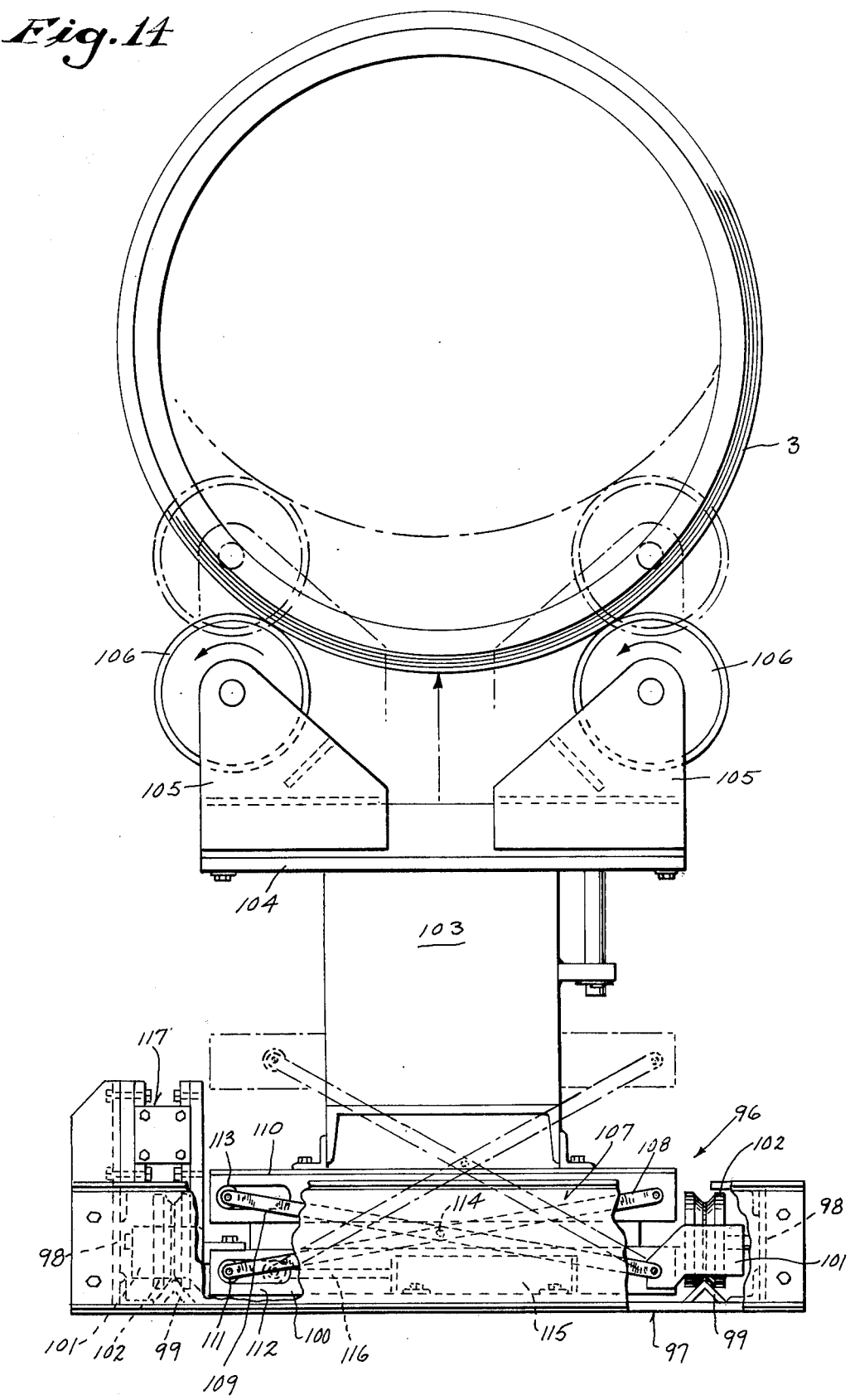
FIG. 14 is an end view of the structure shown in FIG. 12.

To elevate the rollers 106, a scissors lift mechanism 107 is associated with the carriage 100. The scissors lift mechanism 107 includes two pair of arms 108 and 109. The upper ends of the arms 108 are pivotally connected to the upper section 110 of the carriage 100, while the lower ends of arms 108 carry rollers 111 that ride on tracks in the lower section 112 of carriage 100. Similarly, the lower ends of arms 109 are pivoted to section 112 and the upper ends of arms 109 support rollers 113 and ride in tracks on upper section 110 of the carriage. The central portions of the arms 108 and 109 are pivoted together at central pivots 114. As shown in FIG. 14, a hydraulic cylinder unit 115 is mounted on the lower section 112 of the carriage 110 and the ram 116 of the cylinder unit is connected to the lower ends of arms 108. By use of this conventional scissors lift arrangement, retraction of the ram 116 will operate to raise the upper section 110 of the carriage along with the rollers 106 to lift the pipe 3.

To move the elevated carriage 110 and the supported pipe 3 laterally inward toward the opposite conveyor, a pair of cylinder units 117 and 118 are employed. Cylinder unit 117 includes a hydraulic cylinder 119 which is mounted on support plates 120 secured to the side members 98 of base 97. The ram or piston rod 121 of cylinder 119 is connected by a standard misalignment coupling 122 to the piston rod or ram 123 of the hydraulic cylinder unit 118. The cylinder unit 118 includes a cylinder 124 which is mounted through brackets 125 to the carriage 100.

In moving the pipe 3 carried by rollers 101 laterally inward toward the opposite conveyor, the cylinder unit 117 is initially actuated to extend the piston rod 123 and thereby move the carriage 100 and supported pipe 3 inwardly. A pair of photo electric eyes 126 are mounted in a position where the beam will be interrupted by the end of the insert 15 associated with the pipe carried by the carriage 100. When the beam between the photoelectric eyes 126 is broken, the supply of hydraulic fluid to the cylinder 117 will be stopped so that the end of the insert 15 will be positioned at a pre-determined location. Following this, the cylinder unit 118 is actuated through a fixed stroke to thereby position the end of the insert 15 a short distance, in the range of ¼ to ½ inch away from the outer end of the insert of the pipe which is at the winding station 8a and is being wound by the filament winding unit 17.

The use of the two cylinders 117 and 118 will insure that the end of the insert 15 will be positioned at a precise location with respect to the winding unit regardless of the length of the pipe, and regardless of the position of the pipe with respect to the carriage 100.

Figure 15:
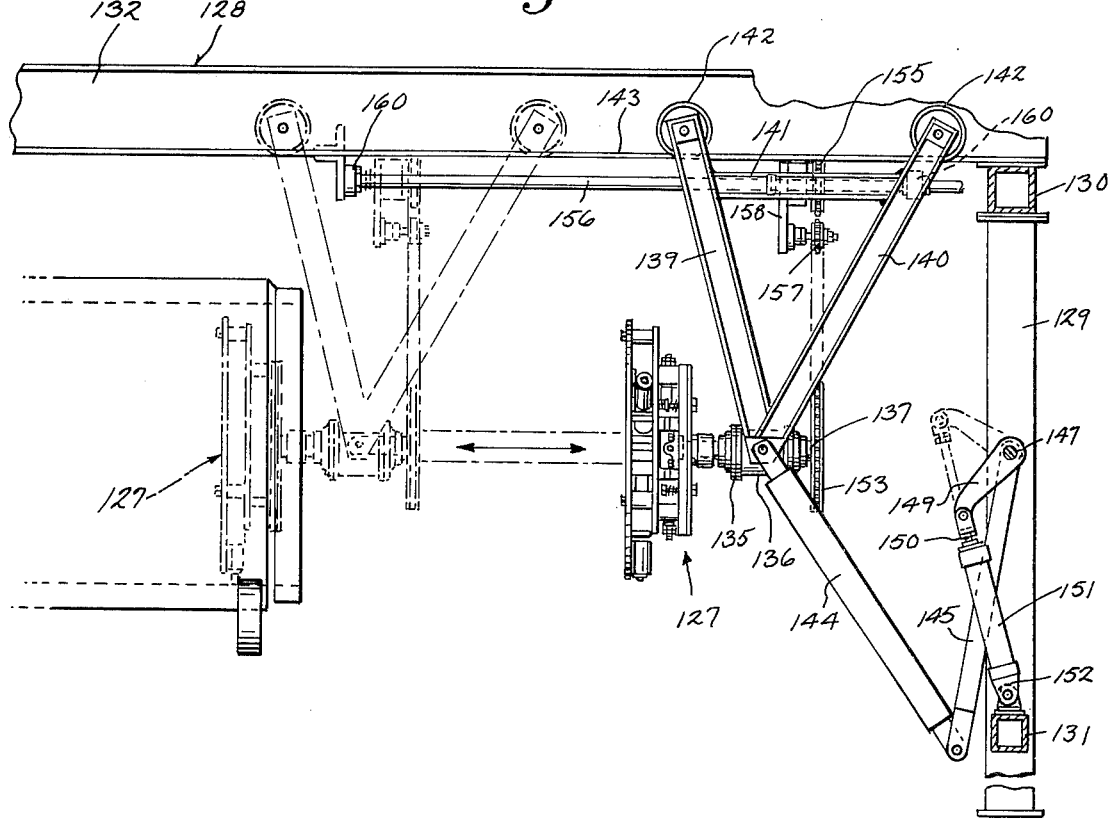
FIG. 15, is a side elevation of the chuck assembly and the chuck drive mechanism.
Figure 16:
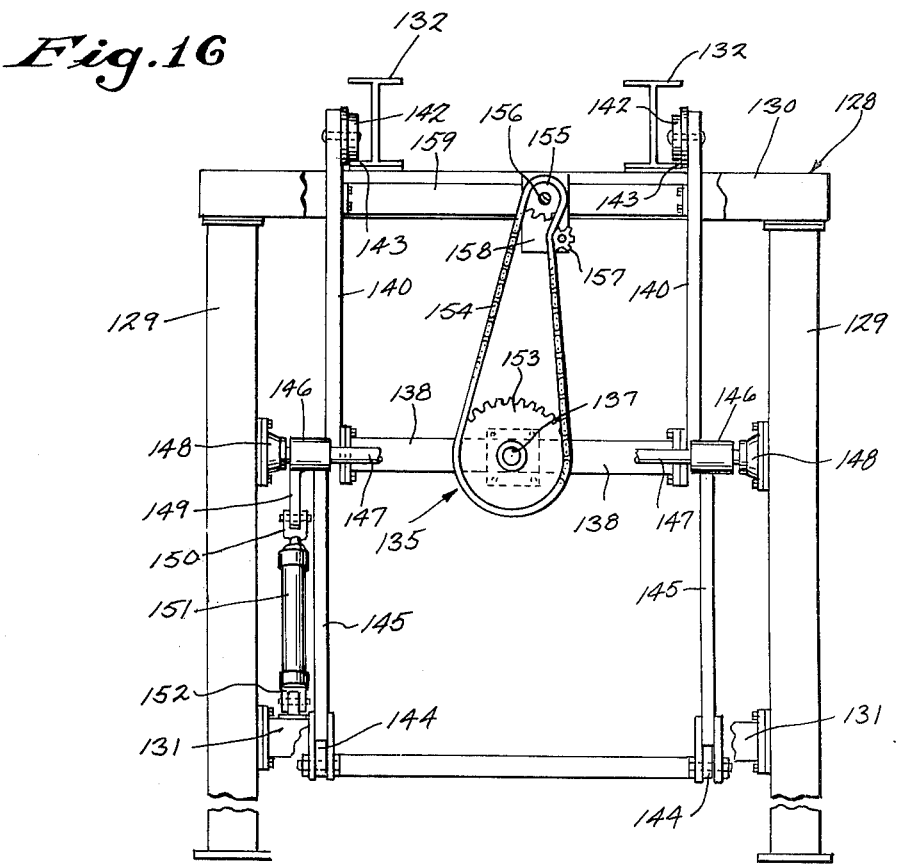
FIG. 16 is an end view of the structure shown in FIG. 15.
Figure 18:
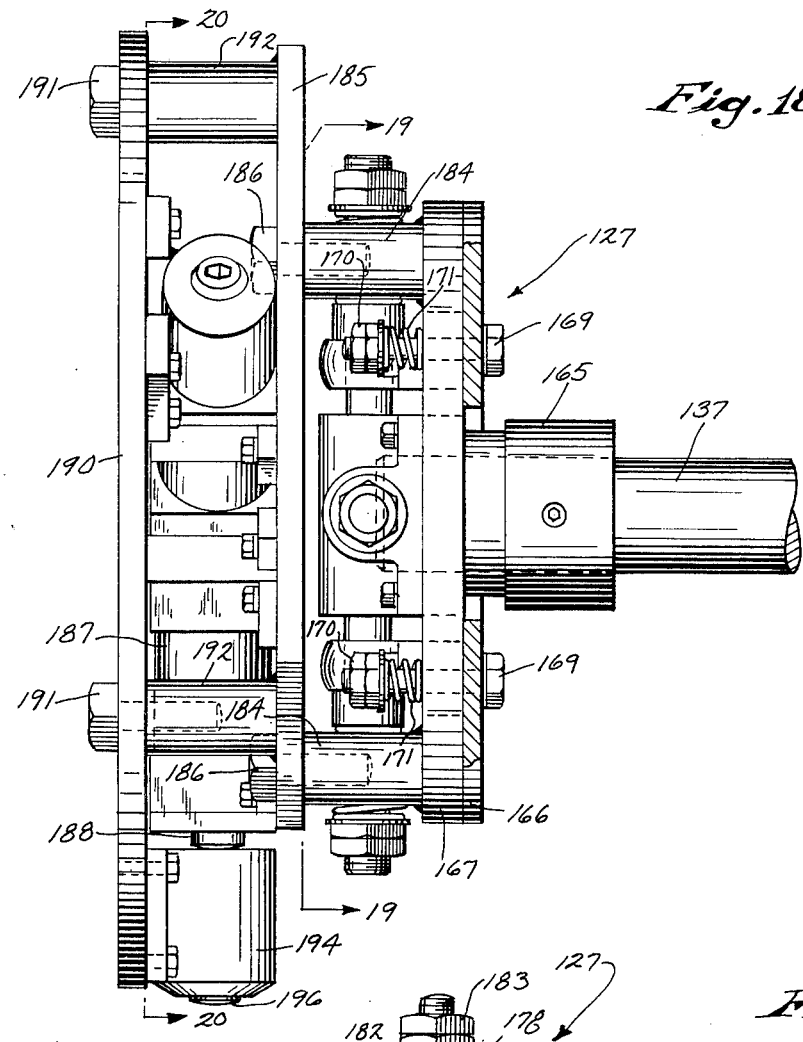
FIG. 18 is an enlarged side elevation of the chuck assembly.
Figure 19:
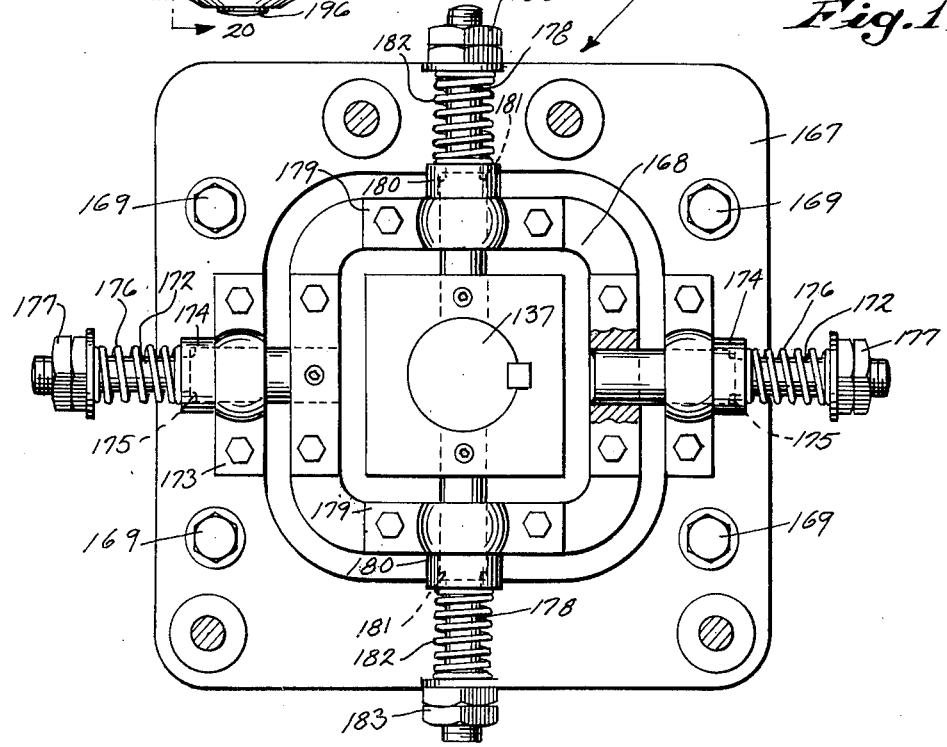
FIG. 19 is a section taken along line 19—19 of FIG. 18.
Figure 20:
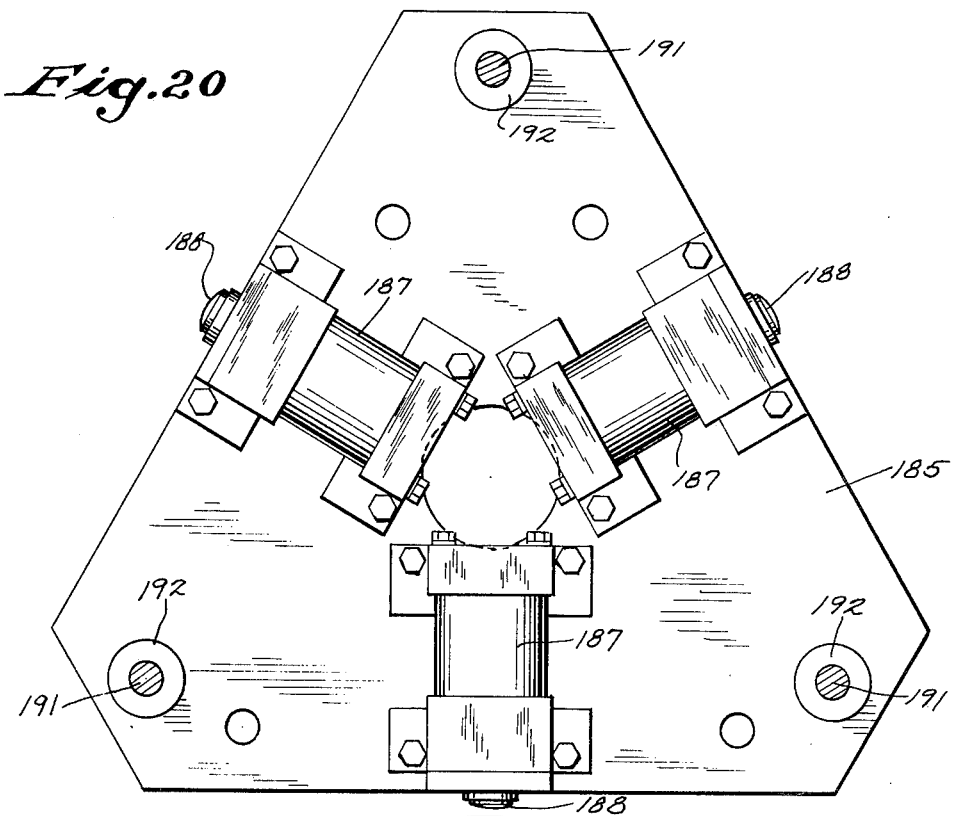
FIG. 20 is a view taken along line 20—20 of FIG. 18.

The pipe 3 is adapted to be rotated about its axis for the winding operation by a chuck mechanism 127. The chuck mechanism and the drive unit to operate the chuck is carried by a supporting frame 128 that extends transversely between the two conveyors 1 and 2. The frame 128 includes a series of vertical columns or supports 129 and each pair of columns is connected together by an upper cross member 130 and a lower cross member 131. I-beams 132 are supported on the upper cross members 130 and extend between the conveyor lines 1 and 2. In addition, cross members 133 are supported on beams 132 and diagonal braces 134 connect ends of cross members 133 to the corresponding columns 129, as shown in FIGS. 15-17.

A chuck support assembly 135 is mounted on the frame 128 and is adapted to move the chuck mechanism 127 into and out of the pipe 3. The check support assembly 135 includes a housing 136 which journals the chuck shaft 137. Cross supports 138 extend laterally from opposite sides of the housing 136, and the outer ends of the supports 138 are connected to the lower ends of arms 139 and 140. As best shown in FIG. 15, the arms 139 and 140, at each side of the frames, are arranged in a V-shape and the upper end portions of arms 139 and 140 are connected together by horizontal braces 141.

Journaled on the upper ends of the arms 139 and 140 are rollers 142 which are adapted to ride on the lower flanges 143 of the respective I-beams 132.

The upper ends of arms 144 are connected to the lower ends of the arms 139 and 140 and the lower end of each arm 144 is pivotally connected to the lower end of an arm 145. The opposite end of each arm 145 is secured to a collar 146 which is secured to a horizontal cross shaft 147 that is journaled in bearings 148 in columns 129.

FIG. 15 shows the chuck in a retracted position (the dashed lines show the extended position) in which case the arms 145 and 146 are disposed in a generally V-shaped coonfiguration. To pivot the arms 144 and 145 to a generally horizontal position and thereby move the chuck horizontally into the pipe 3, one end of a crank arm 149 is secured to the collar 146 and the opposite end of the crank arm is pivotly connected to the outer end of a ram or piston rod 150 of hydraulic cylinder 151. The lower end of the cylinder 151 is pivoted to a lug 152 connected to the lower cross member 131. By extending the ram 150, the arms 144 and 145 will move to an extended, generally horizontal position, thereby moving the chuck 127 horizontally into the open end of the pipe. During this movement the rollers 142 will move along the I-beams 132. On retraction of the ram 150, the arms 144 and 145 will return to their original position withdrawing the chuck 127 from the interior of the pipe.

The chuck shaft 137 is driven through a sprocket 153 which is secured to the end of the shaft 137. Chain 154 connects the sprocket 153 with a sliding sprocket 155 which is splined to the horizontal shaft 156 that is mounted horizontally at an elevation beneath the I-beams 132. A chain tightening sprocket 157 is adjustably mounted on a bracket 158 that is secured to the cross member 159 extending between braces 141. By adjusting the position of the tightener sprocket 157, the tension on the chain 154 can be varied.

The ends of spline shaft 156 are journaled within bearing units 160 and one end of the spline shaft carries a sprocket 161 which is connected to a output shaft of a speed reducing unit 162 by chain 163. The speed reducing unit 162 is driven by a variable speed motor 164 that is mounted on the frame 128. Thus, the motor 164 at each end of the frame 128 will operate through the chain drive 163 to rotate the respective spline shaft 156 to rotate the chuck shaft 137 and chuck 127. The spline connection between the sprocket 155 and shaft 156 enables the sprocket 155 to move axially along the shaft as the chuck is moved in and out of the pipe while maintaining a driving connection between the two members.

The chuck mechanism 127 is best illustrated in FIGS. 18-21 and includes a central hub 165 and the end of the chuck shaft 137 is secured within an axial opening in the hub.

Chuck mechanism 127 also includes a back plate 166, an annular front plate 167 which is disposed on the forward surface of the back plate, and a gimbel plate 168 which is mounted within the central opeining in the front plate 167 and also bears against the forward surface of the back plate 166. To connect the back plate 166 and the front plate 167, a series of studs 169 extend through aligned openings in the plates and the outer ends of the studs receive nuts 170. A coil spring 171 is interposed between each nut and the front plate 167 and urges the plates 166 and 167 into engagement.

Pins 172 extend outwardly from diametrically opposite positions on the gimbel plate 168, and the pins are supported within pillow blocks 173 which are attached to the forward surface of the front plate 167. A cap 174 is located around each pin 172, and the inner surface of each cap bears against the side surface of the corresponding pillow block. Each pin 172 is provided with a shoulder 175 and the outer portion of each cap is spaced from the shoulder 175 so that the inner end of the cap can bear against the pillow block 173.

Each cap 174 is urged inwardly against the pillow block 172 by a spring 176. One end of the spring 176 bears against the outer end of the cap 174, while the opposite end of the spring bears against a retaining nut assembly 177 threaded on the outer end of the pin 172. The pillow blocks 173 enable the pins 172 and the gimbel plate 168 to wobble slightly about the axis of the pins; while also permitting the pins and the gimbel plate to move axially with respect to the pins against the force of the springs 176.

Extending outward from opposite sides of the hub 165 are pins 178 which are located at 90° with respect to the pins 172. Pins 178 are mounted within pillow blocks 179 which are secured to the outer surface of the gimbel plate 168. A cap 180, similar to cap 174, bears against the outer surface of the pillow block 179, and each pin 178 is formed with a shoulder 181 which is spaced from the outer end of the respective cap 180.

To urge each cap 180 against the surface of the pillow block 179, a coil spring 182, similar to spring 176, is located around the outer end of the pin 178 and bears between the outer end of the cap 180 and a retaining nut assembly 183 which is threaded on the outer end of the pin 178.

The pillow blocks 179 permit the gimbel plate 168 to wobble with respect to the axis of the pins 178 and also permit the gimbel plate 168 to move in an axial direction with respect to the pins 178 against the force of the springs 182.

The above described mechanism enables the front plate 167 which carries the chuck to move universally within a plane perpendicular to the axis of the chuck shaft 137 as well as to wobble slightly with respect to that plane. The pipes 3 are normally somewhat out of round, and as the pipe is supported on rollers 101 during the winding operation, it will have a tendency to wobble slightly while rotated about its axis. This mechanism permits the chuck to retain a positive engagement with the wobbling pipe while insuring that the drive shaft 137 does not wobble and is maintained in a precise location during the entire winding operation.

Extending outwardly from the forward surface of the front plate 167 are a series of threaded bosses 184 and a chuck plate 185 is connected to the bosses 184 by screws 186. Three hydraulic cylinders 187 are secured to the forward surface of the chuck plate 185 and the plunger 188 of each cylinder 187 can either engage the inner surface of the pipe 3, or alternately as shown in the drawings, the plunger 188 will actuate a pin 189 carried by an adapter ring 190, and the outer end of the pin will engage the inner surface of the pipe 3 to clamp the pipe to the chuck plate. The adapter ring 190 is secured to the chuck plate 185 by a series of screws 191 which are engaged within threaded bosses 192 in the plate.

Each pin 189 is slideable within a bore 193 in a sleeve 194 that is secured to the surface of the adapter ring 190. The pin 189 is provided with an inner enlarged head 195 which is engaged by the plunger 188, and the outer end of each pin has a rounded tip 196 that engages the inner surface of the pipe 3 to clamp the pipe to the chuck. Springs 197 are disposed around the pins 189 and act to move the pins inwardly out of engagement with the surface of the pipe when the pressure within the cylinders 187 is withdrawn.

With the pipe clamped to the chuck plate 185, rotation of the chuck shaft 137 through operation of motor 164 will rotate the pipe about its axis while supported on the carriage rollers 101. As the pipe 3 may be somewhat out of round, any wobbling characteristics of the pipe will be compensated for by the gimbel assembly which enables the pipe to move universally in a plane perpendicular to the axis of the shaft 137 as well as to wobble slightly out of that plane without affecting the position of the shaft 137.

The filament winding unit 17, as illustrated in FIG. 2, is located between the two conveyors 1 and 2 and includes a framework 198, which supports a series of creels, not shown, which contain a fibrous reinforcing material in coiled form The fibrous reinforcing material can take the form of mineral fibers such as asbestos or glass; natural fibers such as cotton or wool; synthetic fibers such as nylon, Dacron, or Orlon; or the like.

The fibrous material is in the form of two relatively wide bands or strands 199 and 200, each of which is composed of a series of parallel rovings. In accordance with a feature of the invention, the bands 199 and 200 are impregnated with different thermosetting resin systems. Each resin system, individually, has a relatively long pot life or curing time so that the resin systems can be maintained in the separate resin baths 201 for substantial periods of time without danger of curing. However when the two resin systems are mixed by integrating the bands 199 and 200 into a composite band, the mixed resin system will have a very short pot life or curing time at normal room teperature with the result that the resin will cure very quickly after the composite band is applied to the pipe.

As shown in FIG. 1, each band 199 and 200 passes through a separate resin path 201 where the resin system is impregnated in the fibrous material and each bath 201 is mounted on a supporting structure 202. After passing through the resin bath, the bands 199 and 200 travel to a delivery assembly 202' where the individual rovings or yarns of the bands are integrated or intermingled to form a composite band that is wound on the pipe 3.

As shown in FIGS. 22-26, the delivery assembly 202' has a guide unit 203 for the band 199 which serves to maintain the individual rovings of the band in spaced parallel relation. The guide unit 203 includes a bracket 204 which is attached to the ends of a cross support 205 and the bracket carries a pair of pins 206 and a plurality of pins 207 which are located at 90° with respect to the pins 206. The individual rovings of the band 199 pass between the pins 207 to thereby keep the rovings in spaced parallel alignment.

A similar guide unit 208 is provided for the band 200. Guide unit 208 includes an angle-shaped bracket 209 which is secured to the cross support 205. As in the case of guide unit 203, the bracket 209 supports a pair of pins 210 and a plurality of pins 211 which are located at 90° with respect to the pins 210. The individual rovings of the band 200 pass between the pins 211, thereby maintaining the rovings in spaced parallel relation.

The delivery assembly 202' also includes a guide unit 212 which is located adjacent the pipe 3 being wound. The guide unit 212 is provided with a generally U-shaped frame 213, and a pair of guide rods 214 are secured to blocks 215 mounted on the upper surface of frame 213. Rods 214 are adapted to slide within guide bushings 216 mounted on plates 217 of mounting brackets 218 that are secured to the cross support 205. The guide rods 241 permit the frame 213 of guide unit 212 to be moved toward and away from the pipe 3.

To provide a manual adjustment for position of guide unit 212 with respect to pipe 3, a threaded rod 219 is attached to the frame 213 and is threaded within an opening in the plates 217. As shown in FIGS. 22 and 23, the outer end of the threaded rod carries a handknob 220, and by rotating he handknob, the rod 219 will move relative to the plate 217 to thereby adjust the position of the guide unit 212 with respect to the pipe 3.

Figure 24:
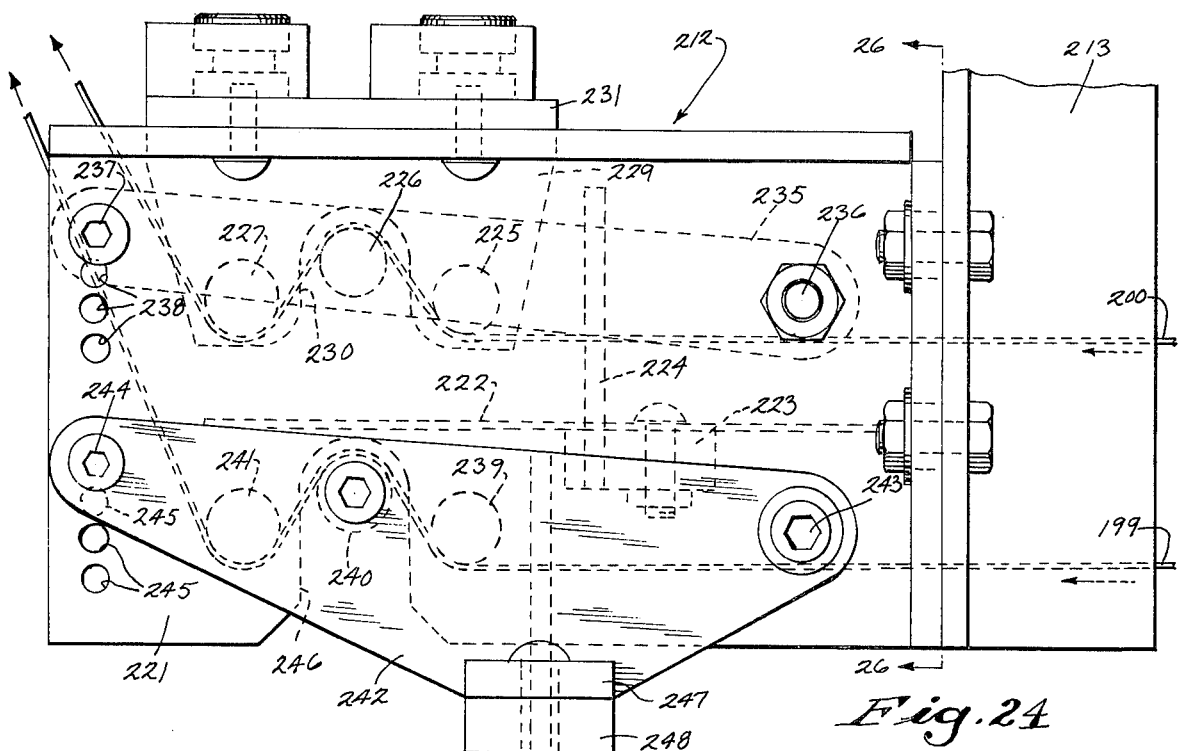
FIG. 24 is an enlarged fragmentary side elevation showing the guide mechanism of the delivery unit.
Figure 25:
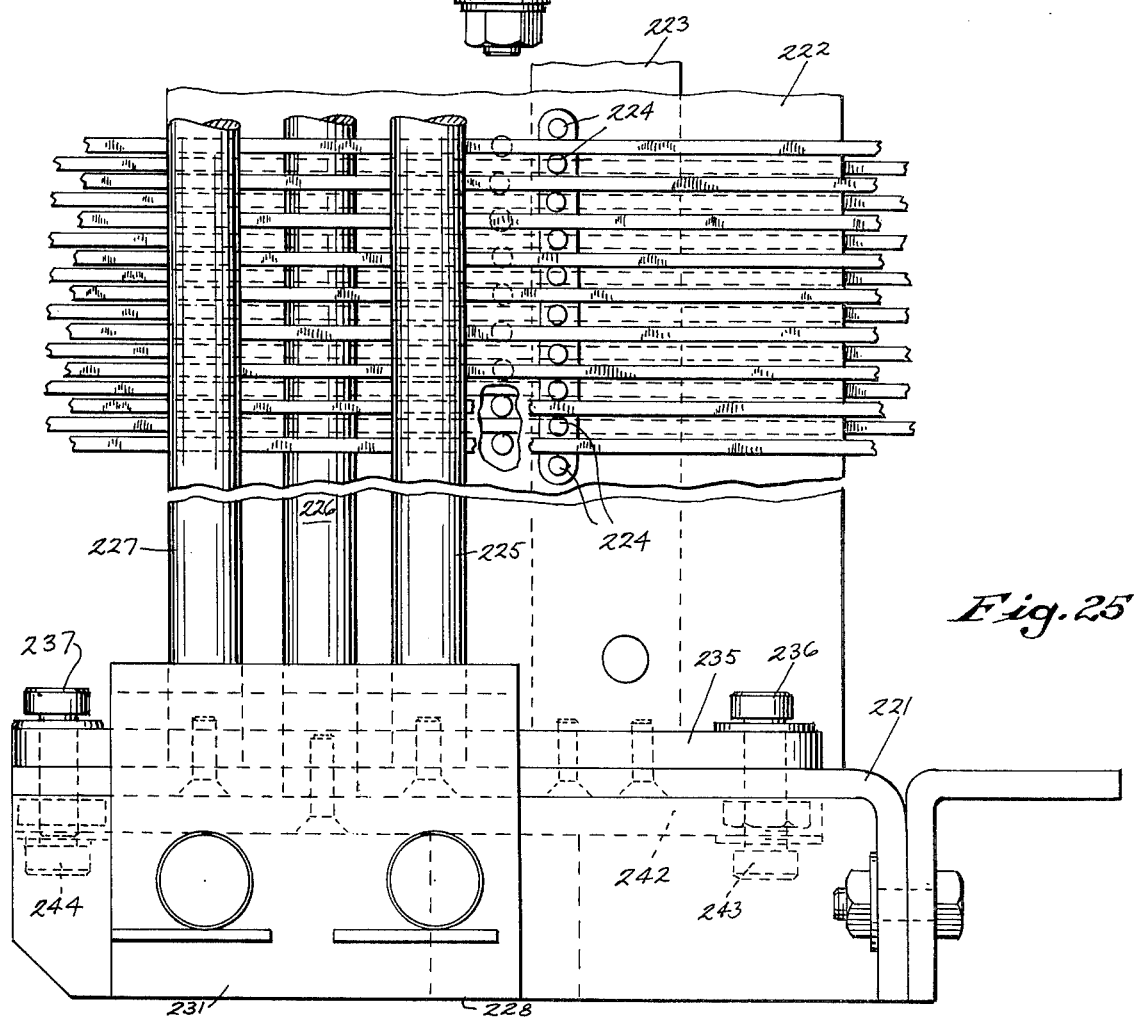
FIG. 25 is a top view of the structure of FIG. 24.

The guide unit 212 also includes a pair of end channels 221 which are connected to the side members of the frame 213. As illustrated in FIG. 24 the end channels 221 are connected together by a drip plate 222, which is located centrally of the end channels and serves to prevent the excess resin on the fibrous band 200 from dripping downwardly and contracting the resin on the band 199.

Figure 21:
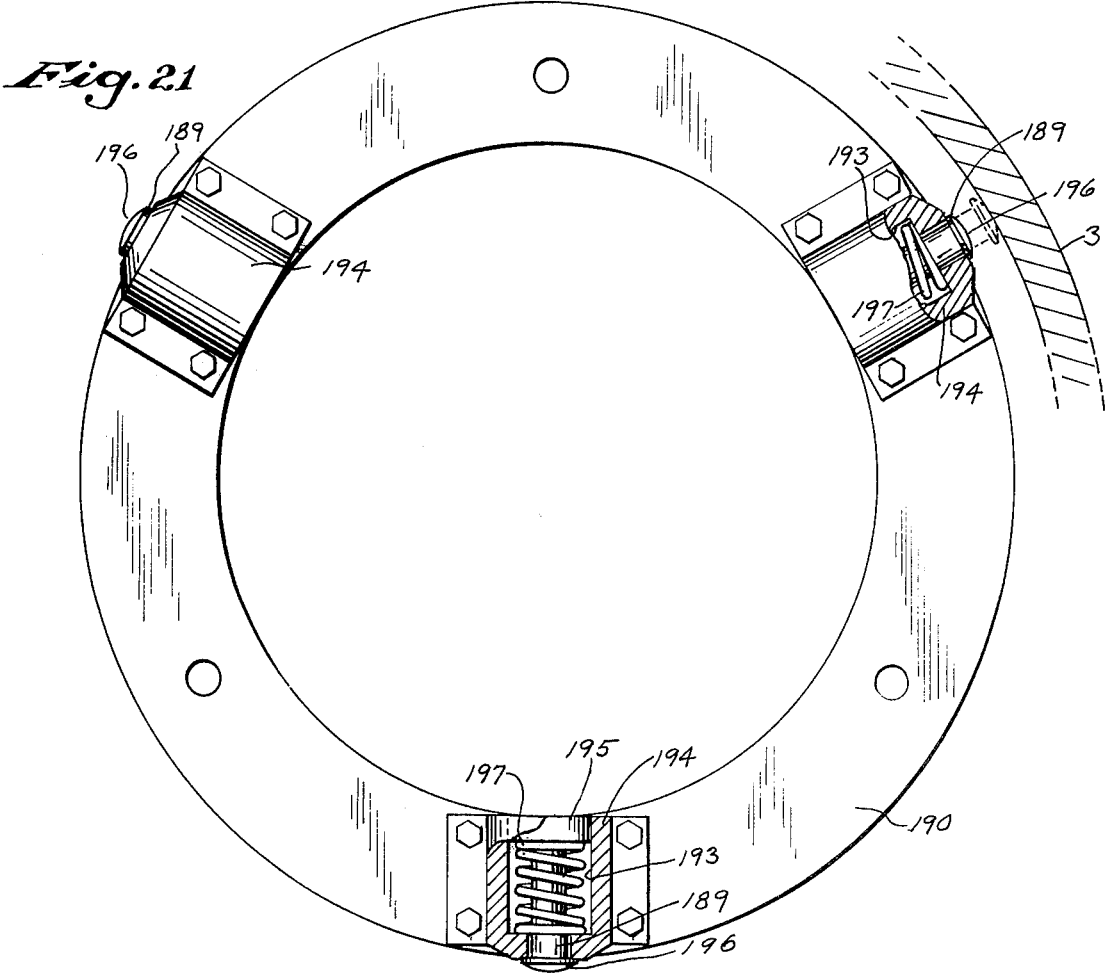
FIG. 21 is a plan view of the adapter ring of the chuck assembly.

Drip plate 222 is secured to the upper surface of a cross bar 223, which extends between the end channels, and a series of spacing pins 224 extend upwardly in spaced relation from bar 223. The rovings of band 200 passes between the pins 224 to maintain proper spacing of the rovings. After passing between the pins 224, the band 200 passes around the rods 225, 226, and 227 and then travels to the pipe 3 as best illustrated in FIG. 21.

The rods 225 and 227 are mounted between angle-shaped support members 228 which are secured to the end-channels 221. As shown in FIG. 23, each rod support includes a generally vertical end section 229 to which the rods 225 and 227 are attached. In addition, each section 229 is formed with a notch 230 which receives the rod 226.

The upper section 231 of each support member 228 is secured to the upper surface of the respective end channel 221. To provide the attachment, a pair of pilot shafts 232 extend upwardly from the end channel through openings in the upper section 231. Each shaft 232 is provided with a circumferential groove 233 and a plastic clip 234 is positioned over the pilot shaft and has a ridge which engages the groove 233 to thereby lock the upper section 231 of the support member to the end channel.

The central rod 226 is carried by a pair of links 235 each of which is pivoted to the respective end channel 221 at pivot 236. With this pivotal connection, the position of the rod 226 can be varied with respect to the rods 225 and 227, and thus the tension of the band 200 passing over and under the rods 225-227 can be varied. The position of the links 235 can be locked with respect to the end channels 221 by a locking pin 237 which can be inserted through one of a series of holes 238 in the end channel.

Figure 26:
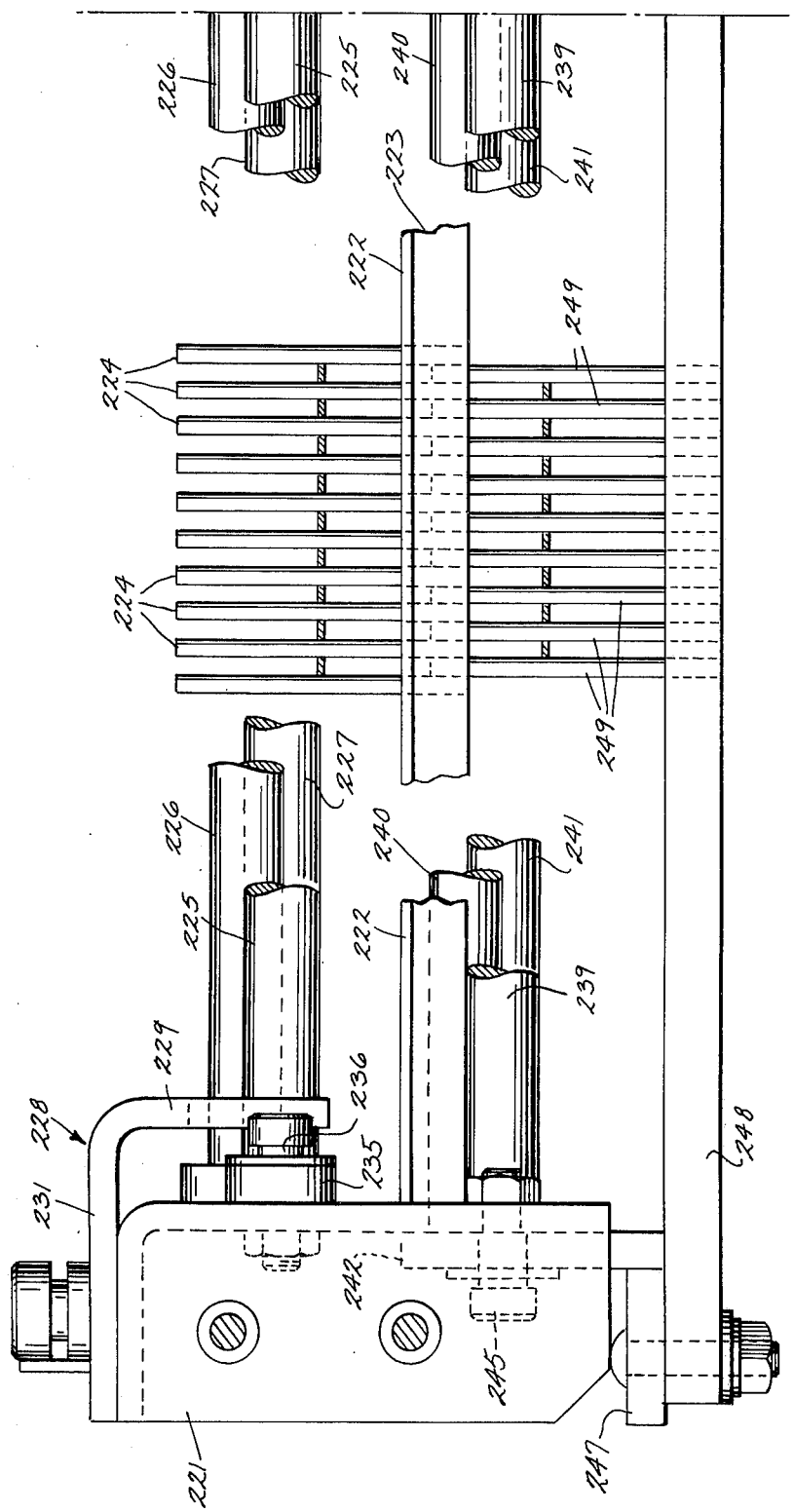
FIG. 26 is a view taken along line 26—26 of FIG. 24.

The fibrous band 199 is adapted to travel over rods 239, 240 and 241 which are also mounted on guide unit 212. As shown in FIG. 26, rods 239 and 241 are secured between the end channels 221, while the central rod 240 is connected to a pair of links 242, each of which is pivoted at pivot 243 to the respective end channel 231.

As in the case of links 235, the links 242 can be pivoted to thereby vary the position of rod 240 with respect to rod 239 and 241 and regulate the tension on the band 199. The pivotal connections at 236 and 243 also enable each guide unit 212 to be opened to facilitate threading of rovings of the bands 199 and 200 in the units and to facilitate service.

Links 242 can be locked in position with respect to the respective end channel 221 by means of a lock pin 244 which is received in one of a series of holes 245 in the end channel.

As shown in FIG. 24 the lower surface of each end channel 221 is provided with a notch 246 which receives the rod 240.

A bar 247 projects outwardly from the lower edge of each link 242 and the bars 247 are connected together by a plate 248 which extends the length of the guide unit. A series of pins 249 extends upwardly from the plate 248 and the individual rovings of the band 199 are adapted to pass between th pins 249 to maintain the desired spacing between the rovings.

The spacing of the pins 248 is out of phase with the spacing of the pins 224, so that as the bands 199 and 200 are wound on the outer surface of the pipe 3 and insert 15, the rovings of band 200 will fall between the rovings of the band 199 in alternating sequence. By alternating or intermingling the individual rovings of both bands, the resin systems on the bands will be mixed together to thereby provide a composite resin system having a substantially shorter pot life or curing time than either of the individual resin systems.

Figure 30:
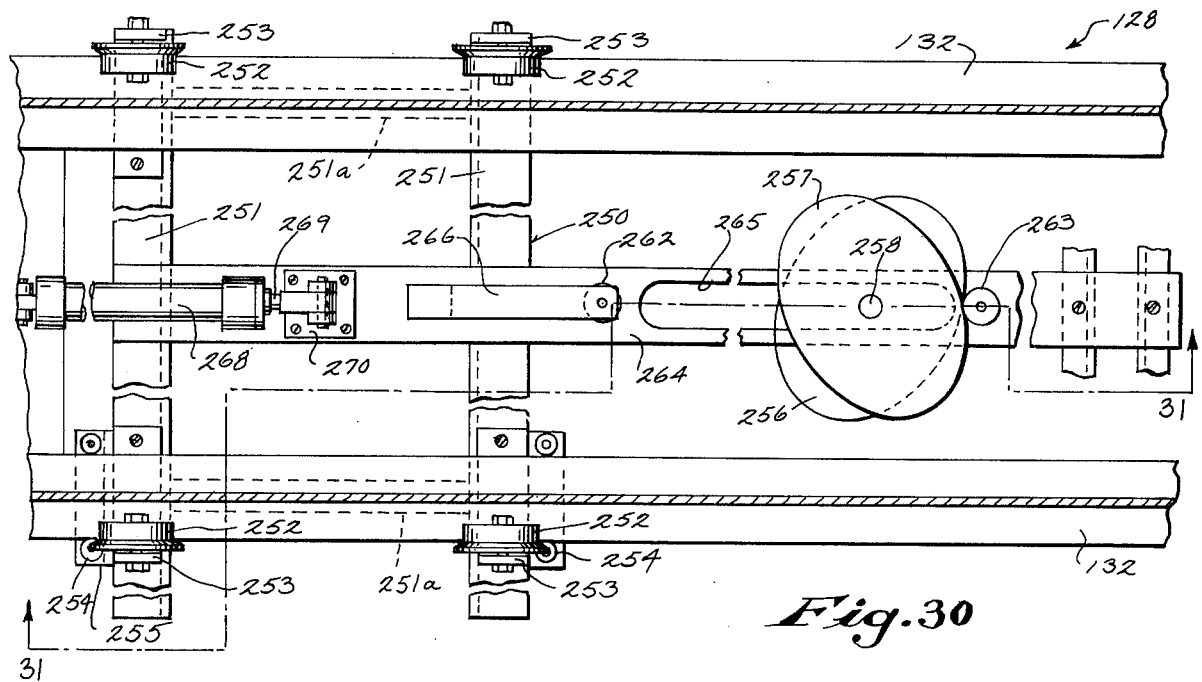
FIG. 30 is a top plan view showing the drive mechanism for the carriage of the delivery unit.

The composite band is wound on the insert and on the adjacent end of the pipe 3 in a generally helical pattern, and to provide this pattern the delivery assembly 202 is mounted on a reciprocating carriage 250 which is mounted for reciprocating movement on the frame 128. As best shown in FIG. 30, the carriage 250 includes a pair of cross angles 251 which are connected together by tie rods 251a. Rollers 252 are journaled on vertical plates 253 which extend upwardly from the cross angles 251 at the corners of the carriage. The rollers 253 are adapted to ride on the lower flanges of the I-beams 132 as the carriage 250 is moved relative to frame 128.

Figure 31:
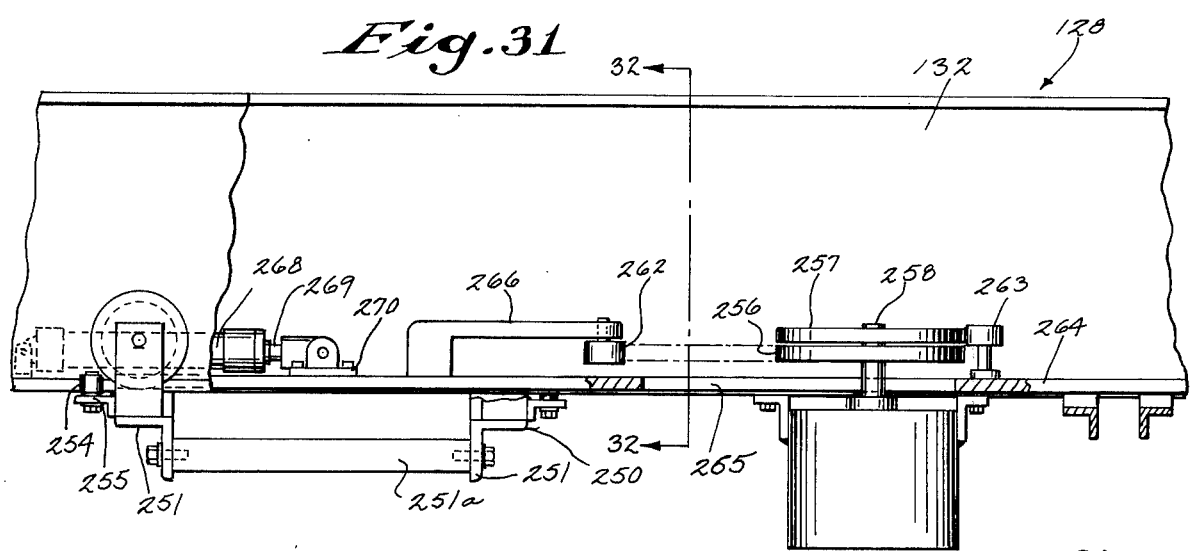
FIG. 31 is a view taken along line 31—31 of FIG. 30.
Figure 32:
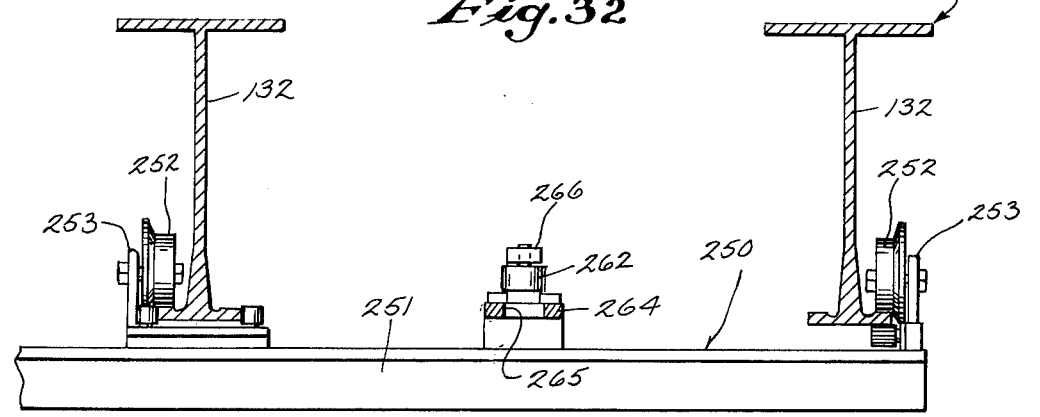
FIG. 32 is a view taken along line 32—32 of FIG. 31.

As shown in FIG. 31, the cross member 205 of delivery assembly 202 is secured to angles 251 so that the delivery assembly will reciprocate with the carriage 250.

The carriage is also guided in reciprocating movement by a series of rollers 254 which are journaled on brackets 255 attached to the cross members 251. As best illustrated in FIG. 31, the rollers 254 ride against the side edges of the lower flanges of the I-beam 132 during reciprocating movement of the carriage 250.

The reciprocating movement of the carriage 250, and thus the winding pattern, is controlled by a cam mechanism including a pair of cams 256 and 257 which are mounted on a vertical shaft 258 which carries a sprocket 259, driven by chain 260.

Each of the cams 256 and 257 is provided with a peripheral cam surface 261, and followers 262 and 263 are mounted on carriage 250 and ride against the surfaces 261 of the respective cams 256 and 257.

During the winding operation on a pipe 3 one of the followers 262, 263 will be engaged with the cam surface of the corresponding cam and as the follower rides on the cam surface, the follower, the carriage 250, and delivery assembly 202, will move back and forth with respect to the pipe 3 and insert 15 to provide the helical winding pattern. After the winding of that pipe is completed, the carriage 250 will shift to move the winding pattern to the adjacent end of a second pipe end. The second follower will move into engagement with the corresponding cam, while the first follower will move out of engagement with its cam. The second follower riding on its cam surface will control the winding pattern on the second pipe.

As shown in FIG. 31, follower 263 is journaled on a bar 264 which is connected to the cross members 251 of carriage 250. The central portion of bar 264 is provided with an elongated slot 265 through which the cam shaft 258 extends. The other follower 262 is journaled on the end of an arm 266 which is mounted above the bar 264 by a spacer 267.

As previously noted, only one of the followers 262 and 263 is in engagement with the respective cam 256, 257 at any time during the winding operation. As shown in FIG. 30, the follower 263 is in engagement with the cam 257 and after winding the pipe, the carriage 250 is shifted longitudinally to move the follower 263 out of engagement with the cam 257 and bring the follower 262 into engagement with its cam 256. Rotation of cam 256 will control the winding of the fibrous band on the pipe end. The slot 265 permits the bar 264 to be shifted longitudinally with respect to the fixed cam shaft 258.

To shift the bar 264 and carriage 250, an air cylinder 268 is employed. One end of the cylinder is affixed to the supporting frame 128 while a rod or ram 269 extends from the opposite end of the cylinder and is connected through mounting plate 270 to the bar 264.

Retracting the ram 269 will move the follower 263 into engagement with the cam 257, while extending the ram 269 will shift the bar 264 to bring follower 262 into engagement with cam 256. The fluid pressure of cylinder 268 serves to bias each follower into engagement with the corresponding cam.

The composite band 271, which is composed of the intermingled rovings of the separate bands 199 and 200, is wound over the end of the pipe 3 and the projecting end of the insert 15, as shown in FIG. 29, to provide the bell end 272. After the winding has been completed at winding station 8 the carriage 250 and bar 264 are shifted longitudinally to move the composite band 271 to the insert 15 of the adjacent pipe at winding station 8a. Shifting of the carriage moves the composite band 271 from point A on the wound pipe at station 8 to point B on the adjacent pipe at station 8a and the winding pattern then proceeds from the point B to point C on the second pipe at station 8a. The use of the two cams 256 and 257 enables the winding pattern on the second pipe to begin at point B and proceed to point C. If a single cam was used, the shifting of the carriage 250 and 264 would move the composite band 271 directly to point C and the helical winding pattern would then proceed from C to B. Shifting the band 271 directly from point A to point C would result in a low angle pass which could sag from the pipe. Thus, the use of the two cams is an advantage in that the composite band is shifted only from point A to point B and the helical winding pattern will then proceed from point B to point C, minimizing the length of the low angle pass of the band 271.

After the composite band has moved from point A on one pipe to point B on the abutting pipe, a cut-off mechanism 273 is employed to cut or sever the band 271 at the joint between the two abutting inserts 15. The cut-off mechanism 273 is best shown in FIGS. 27 and 28 and includes a cross member 274 which is supported on the top of the beams 132 of frame 128. A blade support 275 is pivotally connected to the cross member 274, and a blade 276 is mounted on the lower end of the support 275 by means of a stud 277.

To move the blade 276 inwardly to cut the band 271, an air cylinder 278 is utilized. A ram 279 is slidable within the cylinder 278, and the ram is pivotally connected to lugs 280 attached to support 275.

By extending the ram 279, the blade 276 is moved into the gap between the inserts 15 of the pipe 3 to thereby sever the composite band 271.

The opposite end of cylinder 278 is pivotally connected to a bracket 281 which carries a pair of slide rods 282 that are mounted for sliding movement within bushings in plates 283.

Plates 283 are connected together by angles 284 and the upper ends of the angles are attached to the end of the cross members 274.

The position of the blade 276 with respect to the pipe 3 can be varied through adjustment of a rod 285 which is threaded within the plates 283 and is attached to the bracket 281. A hand knob 286 is attached to the outer end of the rod 285 and by rotating the hand knob, the rod 285 will move the bracket 281 and the cylinder 278 toward and away from the pipe 3, thereby providing an adjustment for various diameter pipe.

After the insert 15 and the end of pipe 3 has been wound with the fibrous band 271 and the band transferred to the adjacent pipe end, and the band is severed, the chuck drive 164 is stopped, the clamping pins 189 are retracted and the chuck drive 164 is stopped, the clamping pins 189 are retracted and the chuck 127 is withdrawn from the interior of the pipe. The pipe is then moved outwardly in two increments through operations of the cylinder units 117 and 118, and lowered through operation of scissors lift 107 to position the pipe in alignment with other pipes on the conveyor.

The wound pipe is then transferred by means of reciprocating walking beam frame 24 to station 9, which is identical to station 6, and on elevation of the lift unit at station 9, the pipe is rotated about its axis which prevents the liquid resin from dripping from the pipe during the first stage of the resin curing operation.

Subsequently the pipe is transferred through stations 10-13 to the discharge station 14. During the period that the pipe is at the stations 9–13, the resin will be completely cured.

Station 14 is the discharge station, and an inclined ramp 287 is secured to the top of the supporting beam 123 at each side of the conveyor. The upper surface of the ramp 287 is provided with a wear strip 288. As shown in FIG. 6, the end of the ramp 287 projects beyond the corresponding end of the beam 123 and a gusset plate 289 is connected between the end of the beam 132 and the end of the ramp to support the same.

The pipe is transferred from station 13 to station 14 by the reciprocating walking frame 24, and the pipe at the station 14 is then elevated by the lift unit 39 to raise the pipe above the level of the reciprocating frame and enable the frame to be returned to its original position. The lift unit 39 at station 14 is then lowered, and as the cradles 34 of the reciprocating frame 24 are not in position at station 14, the pipe is lowered onto the inclined ramps 287 and will roll by gravity down along the ramps to a collection area.

The drive system for the apparatus is shown schematically in FIG. 33. The variable speed motor 164 for each conveyor 1 and 2, operates through the speed reducer 162 and chain drive 163 to drive the respective spline shaft 156, and rotation of each shaft is transmitted through chain drive 154 to drive the respective chuck shaft 137 to rotate the pipe 3 at the winding station.

Each spline shaft 156 also carries a sprocket 290 which is connected to sprocket 291 of clutch unit 292, and clutch units 292 are mounted on a common line shaft 293. With the clutch units 292 engaged, a driving connection will be provided between the respective spline shaft and the line shaft 293. The line shaft 293 is journalled on frame 128 and extends between the conveyors 1 and 2.

Sprocket 294 is mounted on line shaft 293 and is connected through chain drive 295 to a sprocket 296 on input shaft 297 of gear box 298, while the output shaft 299 of the gear box carries a sprocket 300 that is connected by chain 301 to sprocket 302 on shaft 303. A gear 304 on shaft 303 operates through a gear train indicated generally by 305, to drive shaft 306, and a sprocket 307 on shaft 306 is connected by chain 308 to a sprocket 309 on the cam shaft 258 which carries the cams 256 and 257.

Operation

As previously described, the conveyor 1 includes stations 4–14 and conveyor 2 includes a series of similar stations 4a–14a. The work functions performs at the corresponding stations are identical although the movements of the two conveyors are not in phase. Thus, the operation will be described with respect to a single pipe moving through the stations 4–14 of conveyor 1, but it is recognized that in normal operation there will be pipes at all stations 4–14, as well as at stations 4a–14a.

The pipe 3 is initially positioned on the cradle 34 of the reciprocating frame 24 at station 4 by a hoist or other lifting mechanism, and the reciprocating frame 24 is then actuated by means of cylinder unit 31 to move the pipe to station 5. At this station the lift unit 39 is operated to engage the cradles 40 with the pipe to lift the pipe above the cradles 34 of the reciprocating frame 24. With the pipe elevated, the frame 24 can be returned to its original position by cylinder unit 31. Subsequently, the lift unit 39 is lowered to lower the pipe back onto the cradles 34 of the reciprocating frame in preparation for the next succeeding advancement.

While the pipe is at station 5, the metal insert or ring 15 is inserted, either manually or by automated equipment, within the open end of the pipe, as best shown in FIG. 29, the ring 15 is provided with an extension 311 which is located within the pipe end and has an external shoulder 312 which is engaged by the end of the pipe. The outer portion of the insert 15 tapers outwardly, as indicated by 313, to provide the wound bell 272 with a slight degree of taper to facilitate insertion of the spigot end of a second pipe during installation.

The pipe station 5 is then moved to station 6 by operation of the reciprocating frame 24, and the pipe at station 6 is then lifted above the level of the frame 24 by lift unit 39 so that the frame can be returned to its original position.

While the pipe is elevated by the lift unit 39 at station 6, the pipe is rotated about its axis by pipe rotating unit 61, and a gel coat of resin is applied through nozzle 16 to the end of the rotating pipe, as well as to the projecting end of the insert 15. Subsequently, the lift unit is lowered to return the pipe to cradles 34 on the reciprocating frame.

The pipe is then transferred from station 6 to station number 7 by the same action of the reciprocating frame and no working operation is performed at station 7.

Subsequently, the pipe is transferred by the reciprocating frame to station 8 which is the winding station. At station 8 the scissors lift 107 is operated to lift the pipe above the level of the cradles 34. The reciprocating frame 24 can then be returned to its original position. The carriage 110 supporting the pipe is then moved laterally inward toward the other conveyor 2 by operation of the hydraulic cylinder unit 118. When the leading end of the insert 15 breaks the beam of the photo electric eyes 126, the supply of fluid to the cylinder unit 118 will be stopped to thereby stop the movement of the carriage 110 and the pipe. The second cylinder unit 117 is then operated with a predetermined or fixed stroke which will position the end of the insert 15 a short distance from the end of the insert of a pipe 3 located at the winding station 8a. The chuck 127 is moved into the interior of the pipe at station 8 by operation of the cylinder unit 151 and the clamping pins 189 are moved outwardly into the engagement with the inner surface of the pipe through operation of cylinders 187. The motor 164 is then operated to drive the chuck and rotate the pipe about its axis on the supporting rollers 106 of the carriage 100. As previously noted, the pipes 3 will generally be out of round and the gimbel assembly permits the pipe to wobble on the rollers 106 while maintaining the axial position of the chuck shaft 137.

After the desired number of passes have been made on the pipe at station 8a by the delivery assembly 202 to develop the required thickness for the bell end 272, the air cylinder 268 is programmed to shift the bar 264 and move the follower 262 into engagement with the cam 256, thereby shifting the winding pattern to the pipe located at station 8. The rotation of the cam 256 will then control the winding of the band 271 in a generally helical pattern on the projecting end of the insert 15 as well as on the adjacent end of the pipe 3 at station 8.

After the band 271 has been transferred to the pipe at station 8, the cutting mechanism 273 operates to sever the band at the joint between the two abutting inserts 15. The wound pipe at station 8a is then moved back to its conveyor line. This is accomplished, during the period that the winding operation is being performed on the pipe at station 8, by initially stopping the rotation of the chuck 127 and withdrawing the clamping pins 189. The chuck 127 is then moved outwardly of the wound pipe at the station 8a through operation of the cylinder 151. With the chuck removed, the cylinder 117 is initially actuated to move the pipe in the first outward step followed by operation of the hydraulic cylinder unit 118 which returns the pipe to the conveyor line. Scissors lift 107 is then operated to lower the pipe at the station 8a back onto the cradles 34 of the reciprocating frame 24.

The conveyor 2 is then indexed to move the pipe at station 7a to the winding station 8a and the pipe at station 8a is then moved inwardly in the manner described to position the insert 15 in proximate abutting relation with the insert 15 of the pipe being wound at station 8.

After the winding operation has been completed on the pipe at station 8, the carriage 250 is again shifted to move the delivery assembly 202 to the pipe at station 8a, and after several passes have been made on the pipe at station 8a, the cutoff mechanism 273 is operated to sever the band 271 at the joint between the abutting inserts 15.

After severing of the band, the rotation of the pipe at station 8 is stopped by discontinuing the operation of the chuck drive, and the clamping pins 189 are withdrawn to permit the chuck 127 to be withdrawn from the pipe through operation of the cylinders 117 and 118 to position the pipe in the line of the conveyor 1. Scissors lift 107 then acts to lower the wound pipe onto the cradles 34 of the reciprocating frame 24.

The frame 24 is then indexed to move the pipe to station 9, and lift unit 39 is actuated to lift the pipe above the level of the reciprocating frame to enable the frame to be indexed back to its original position. Pipe rotating unit 61 is then operated to rotate the wound pipe about its axis and prevent any liquid resin from dripping from the pipe during the initial period of the curing operation.

The pipe is then lowered onto the frame 24 and transferred from stations 9 to station 14 by the indexing operation of the reciprocating frame 24, as previously described. At station 14, the pipe, after being elevated from frame 24 by the lift unit 39, is lowered by the lift unit onto the inclined ramps 287, without interference from frame 24 for the end of the reciprocating frame 24 is located at station 13 at this time. The pipe will then roll by gravity down the inclined ramps 287 to a collection area.

The invention provides a continuous process for winding a fiber reinforced resin bell on the end of cylindrical pipe sections. The winding is programmed to be automatically transferred from one pipe to the next, thereby eliminating the necessity of manually reattaching the strand to each pipe at the start of the winding operation.

Various modes of carrying out the invention are contemplated as being within the scope of the following claims particularly pointing out and distinctly claiming the subject matter which is regarded as the invention.

I claim:

1. An apparatus for winding a fiber reinforced resin section on the end of a mandrel, comprising first conveyor means to convey a first mandrel, first delivery means for moving the first mandrel from the first conveyor means to a first winding position and for withdrawing said first mandrel from the first winding position, second conveyor means to convey a second mandrel, second delivery means for moving the second mandrel from the second conveyor means to a second winding position and for withdrawing said second mandrel from said second winding position, said mandrels being in end-to-end promimate abutting relation when in the respective winding positions, rotating means for independently rotating each mandrel at the winding position about its axis, a reciprocating winding carriage feeding a strand impregnated with resin, first means for causing reciprocating movement of said carriage in a first reciprocating path to form a first wound section of said resin impregnated strand on said first mandrel, transfer means for shifting said strand to the second mandrel located at its winding position, second means for causing reciprocating movement of said carriage in a second reciprocating path separate from the first path to form a second wound section of said resin impregnated strand on said second mandrel, and cutting means for cutting the strand at the joint between the abutting mandrels after operation of said transfer means and during winding of said second wound section.

2. The apparatus of claim 1, wherein each mandrel comprises a cylindrical pipe having an insert ring projecting from the abutting end of the respective pipe, each wound section extending over the projecting end of the respective insert and the corresponding end of the pipe.

3. An apparatus for winding a fiber reinforced resin bell on the end of a cylindrical pipe, comprising a first conveyor for conveying a first pipe having an open end and having a first insert ring disposed in said end with a portion of the first ring projecting from said end, said first conveyor including a first winding station, a second conveyor for conveying a second pipe having an open end and having a second insert ring disposed in said end of said second pipe with a portion of the second ring projecting from said end of said second pipe, said second conveyor including a second winding station, first delivery means at the first winding station for moving the first pipe axially in a direction toward the second winding station to a first winding position and for returning said first pipe from the first winding position to the first conveyor, second delivery means at said second winding station for moving the second pipe axially in a direction toward said first winding station to a second winding position and for returning said second pipe from the second winding position to said second conveyor, said second insert being in abutting proximate relation with said first insert when said pipes are at the respective winding positions, rotating means for rotating each pipe at the winding position about its axis, winding means disposed between said conveyors for winding a strand impregnated with a binder around the projecting end of the first insert and the corresponding end of the first pipe located at its winding position to form a bell, transfer means for shifting said winding means to transfer the strand to the second pipe located at its winding position and winding the strand around the projecting end of the second insert and the corresponding end of the second pipe to form a second bell, and cutting means for cutting the strand at the joint between the abutting inserts after operation of said transfer means.

4. The apparatus of claim 3, wherein said first delivery means includes first advancing means for moving the first pipe in a first increment of movement, sensing means located at a predetermined position in the path of movement of said first pipe for sensing the position of the outer end of the insert of the first pipe and stopping operation of said first advancing means, and second advancing means for moving the pipe in a second given increment of movement to position the first pipe at the first winding position.

5. The apparatus of claim 4, wherein said first and second advancing means are fluid cylinders.

6. The apparatus of claim 3, and including a carriage located at each winding station and disposed to support the respective pipe, means for mounting the carriage for movement in a direction toward the opposite winding station, each delivery means being operably connected to the respective carriage to move the carriage and the pipe supported thereon.

7. The apparatus of claim 3, wherein each conveyor includes a series of stations including an entry station and a discharge station, the winding station of each conveyor being located between the respective entry station and discharge station, and means for moving each pipe between the stations of the respective conveyor.

8. The apparatus of claim 7, wherein each conveyor includes a curing station located between the respective winding station and the discharge station, and means disposed at each curing station for rotating the pipe at the curing station about its axis while the resin is being cured.

9. The apparatus of claim 3, wherein said rotating means comprises chuck means, means for clamping said chuck to the end of the pipe opposite the end containing the insert, and means for rotating said chuck means.

10. The apparatus of claim 3, wherein said rotating means comprises a radially expandable chuck including a plurality of pipe engaging elements, actuating means for moving the chuck longitudinally into the end of the pipe opposite from the end containing the insert and for withdrawing the chuck from the pipe, expanding means for expanding the chuck to move the elements into engagement with the inner surface of the pipe, and drive means for rotating the chuck.

11. The apparatus of claim 10, wherein each delivery means includes a carriage to support the pipe for rotation about its axis, and said rotating means comprises universal support means for mounting the said pipe engaging elements for universal movement with respect to the axis of the chuck, whereby the axis of the chuck will be maintained in a fixed position during rotation of the pipe regardless of any out-of-round condition in said pipe.

12. The apparatus of claim 11, wherein said universal support means includes first mounting means for mounting said elements for movement in a first radial direction with respect to the chuck axis, and second mounting means for mounting said element for radial movement in a second direction normal to said first direction.

13. In a filament winding apparatus, means for positioning a pair of mandrels in end-to-end relation with the ends of the mandrels being spaced apart, winding means for winding a strand of resin impregnated fibrous material on the end of a first of said mandrels to form a first wound section, transferring means for transferring the strand to the end of the second of said mandrels, said winding means winding the strand on the end of said second mandrel to form a second wound section, and cutting means disposed at the joint between the abutting ends of the mandrels to sever the strand at the joint, said winding means including a carriage mounted for reciprocating movement longitudinally of the mandrels, strand guiding means carried by the carriage for guiding the strand onto each mandrel, mandrel rotating means for rotating each mandrel about its axis, and carriage drive means including a first rotatable cam member having a first cam surface and a second rotatable cam member having a second cam surface, a first follower disposed to ride on the first cam surface and connected to said carriage, a second follower disposed to ride on said second cam surface and connected to said carriage, means for rotating said cam members, said carriage being moved in a first reciprocating path as said first follower rides on the first cam surface of the first cam member to form said first wound section, and said carriage being moved in a second reciprocating path as said second follower rides on the second cam surface of the second cam member to form said second wound section, said transfer means acting to move one of said followers into engagement with the respective cam surface and simultaneously move the other of said followers out of engagement with the respective cam surface.

14. The apparatus of claim 13, wherein the followers are mounted in spaced relation on the carriage and the cams are mounted on a common drive shaft.

15. The apparatus of claim 13, wherein said first reciprocating path is in registry with an end portion of the first mandrel and the second reciprocating path is in registry with an end portion of the second mandrel.

* * * * *

UNITED STATES PATENT AND TRADEMARK OFFICE
CERTIFICATE OF CORRECTION

PATENT NO. : 4,062,717

DATED : December 13, 1977

INVENTOR(S) : WILLIAM GEORGE McCLEAN

It is certified that error appears in the above-identified patent and that said Letters Patent are hereby corrected as shown below:

Column 1, line 27, Cancel "enlared" and substitute therefor ---enlarged, Column 1, line 44, Cancel "in particularly" and substitute therefor ---in particular, a---, Column 1, line 49, Cancel "moves" and substitute therefor ---moved---, Column 2, line 17, Cancel "carying" and substitute therefor ---varying--- Column 3, line 40, Cancel "more" and substitute therefor ---move---, Column 3, line 51, Cancel "a" and substitute therefor ---an---, Column 4, line 32, Cancel "longitudnal" and substitute therefor ---longitudinal---, Column 4, Line 36, Cancel "Fig.2" and substitute therefor ---Fig.3---, Column 5, line 22, Cancel "extendes" and substitute therefor ---extends--- Column 5, line 24, Cancel "to end" and substitute therefor ---to the end---, Column 5, line 37, Cancel "orignal" and substitute therefor ---original---, Column 5, line 49, Cancel "plane" and substitute therefor ---plate---, Column 6, Line 4, Cancel "of", first occurrence, and substitute therefor ---on---, Column 6, line 22, Cancel "pivotly" and substitute therefor ---pivotally---, Column 6, Line 49, After "vertical" insert ---bar---, Column 8, line 17, Cancel "check" and substitute therefor ---chuck---, Column 8, line 39, Cancel "coonfiguration" and substitute therefor ---configuration---, Column 8, line 43, Cancel "pivotly" and substitute therefor ---pivotally---, Column 10, line 63, Cancel "teperature" and substitute therefor ---temperature---, Column 10, line 67, Cancel "path" and substitute therefor ---bath---, Column 11, line 33, Cancel "rods 241" and substitute therefor ---rods 214---, Column 11, Line 40 Cancel "he" and substitute therefor ---the---, Column 11, line 49, Cancel "contracting" and substitute therefor ---contacting---, Column 11, line 55, Cancel "passes" and substitute therefor ---pass---, Column 12, line 43, Cancel "th" and substitute therefor ---the---, Column 14, line 54, Cancel "the chuck drive 164 is stopped, the", Column 14, line 55 Cancel "clamping pins 189 are retracted and", Column 15, line 50 Cancel "performs" and substitute therefor ---performed---,

UNITED STATES PATENT AND TRADEMARK OFFICE
CERTIFICATE OF CORRECTION

PATENT NO. : 4,062,717

DATED : December 13, 1977

INVENTOR(S) : WILLIAM GEORGE McCLEAN

It is certified that error appears in the above-identified patent and that said Letters Patent are hereby corrected as shown below:

Column 20, line 5, CLAIM 12, Cancel "element" and substitute therefor ---elements---, Column 18, line 3, CLAIM 1, Cancel "promimate" and substitute therefor ---proximate---

Signed and Sealed this

Twenty-fifth Day of April 1978

[SEAL]

Attest:

RUTH C. MASON
Attesting Officer

LUTRELLE F. PARKER
Acting Commissioner of Patents and Trademarks